United States Patent
Ghosh et al.

(10) Patent No.: US 12,461,971 B1
(45) Date of Patent: Nov. 4, 2025

(54) APPARATUSES, COMPUTER-IMPLEMENTED METHODS, AND COMPUTER PROGRAM PRODUCTS, FOR DATA REPOSITORY OWNERSHIP IDENTIFICATION

(71) Applicant: Wells Fargo Bank, N.A., San Francisco, CA (US)

(72) Inventors: Deepa Ghosh, Charlotte, NC (US); Lisa M. Lee, Salt Lake, UT (US); Jamie Kennedy, Charlotte, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 169 days.

(21) Appl. No.: 17/339,358

(22) Filed: Jun. 4, 2021

(51) Int. Cl.
*G06F 16/9035* (2019.01)
*G06F 16/9038* (2019.01)

(52) U.S. Cl.
CPC ...... *G06F 16/9035* (2019.01); *G06F 16/9038* (2019.01); *G06F 2221/2141* (2013.01)

(58) Field of Classification Search
CPC .. G06F 16/148; G06F 16/176; G06F 21/6218; G06F 2221/2141; G06F 9/468; G06F 16/9024; G06F 16/9535; G06F 21/31; G06F 16/9035; G06F 16/9038; G06F 16/903
See application file for complete search history.

(56) References Cited

U.S. PATENT DOCUMENTS

| | | | |
|---|---|---|---|
| 5,051,891 A | 9/1991 | MacPhail | |
| 6,324,581 B1 | 11/2001 | Xu et al. | |
| 7,035,867 B2 | 4/2006 | Thompson et al. | |
| 7,590,747 B2 | 9/2009 | Coates et al. | |
| 8,250,037 B2 | 8/2012 | Anderson et al. | |
| 8,645,636 B2 | 2/2014 | Jaquette | |
| 8,832,152 B2 | 9/2014 | Turner et al. | |
| 8,931,054 B2 | 1/2015 | Huynh et al. | |
| 9,361,187 B2 * | 6/2016 | Jarvis | G06F 11/1458 |
| 10,409,579 B1 * | 9/2019 | Morris | G06F 11/3055 |
| 2013/0227714 A1 * | 8/2013 | Gula | G06F 21/64 726/32 |
| 2014/0359085 A1 * | 12/2014 | Chen | H04L 63/102 709/220 |
| 2015/0205600 A1 * | 7/2015 | Grillo | G06F 16/148 717/101 |

(Continued)

*Primary Examiner* — Marcin R Filipczyk
(74) *Attorney, Agent, or Firm* — K&L Gates LLP

(57) ABSTRACT

Embodiments of the present disclosure provide for improved identification of ownership and/or ownership lineage for a data repository, such as a shared file drive. Ownership data and/or ownership lineage data is identified based on data associated with the data repository itself and/or file data objects stored thereon in conjunction with data from a user linkage database. In this regard, accurate identification of a particular owner or owner(s) of a data repository may be determined from the data repository, and the user linkage database may serve additional details of such owner(s), linkages to other user(s) and/or group(s) of users embodying owner(s), and/or the like. Identified ownership data and/or ownership lineage data may be used for a myriad of additional processes, such as to notify users, determine what data repositories to perform detailed, efficient scans of based on group membership of the owner of said data repositories, or the like.

14 Claims, 12 Drawing Sheets

(56) References Cited

U.S. PATENT DOCUMENTS

| | | | | |
|---|---|---|---|---|
| 2017/0102988 | A1* | 4/2017 | Purushothaman | G06F 11/0709 |
| 2018/0307847 | A1* | 10/2018 | Lee | H04L 9/06 |
| 2020/0349239 | A1* | 11/2020 | Tyagi | G06F 21/105 |
| 2021/0271662 | A1* | 9/2021 | Muse | G16H 10/60 |
| 2021/0286779 | A1* | 9/2021 | Joshi | G06F 16/28 |
| 2022/0368974 | A1* | 11/2022 | Chow | H04N 21/236 |
| 2023/0020193 | A1* | 1/2023 | Williams | H04L 9/0825 |

* cited by examiner

APPARATUSES, COMPUTER-IMPLEMENTED METHODS, AND COMPUTER PROGRAM PRODUCTS, FOR DATA REPOSITORY OWNERSHIP IDENTIFICATION

TECHNOLOGICAL FIELD

Embodiments of the present disclosure generally relate to management and processing of data repositories, such as shared data repositories in a data repository, such as shared data repositories accessible via a network, and specifically to efficient and accurate identification of data repository owner information and owner lineage information for further processing.

BACKGROUND

Management of data repositories, particularly shared data repositories, often involves particular users taking one or more actions that alter the configuration of the data repository and/or data objects stored therein. Identification of an appropriate user (e.g., an owner of a data repository) that is permitted and/or otherwise appropriate for taking such actions is fraught with issues. Such issues are especially prevalent in large data systems and/or in circumstances where the user set of possible owners is large and/or often changing. Applicant has discovered problems with current implementations for identifying data repository owner information and owner lineage information. Through applied effort, ingenuity, and innovation, Applicant has solved many of these identified problems by developing embodied in the present disclosure, which are described in detail below.

BRIEF SUMMARY

In general, embodiments of the present disclosure provided herein identify data repository and/or data object ownership by processing metadata associated with the data repository and/or data within the data repository. Conventional methodologies fail to identify such owners accurately, especially in circumstances of large data repositories, large data systems, and/or computing environments having a large number of users and/or user sets that often change (e.g., the user set changes between when owner data for a data repository is assigned and when the data repository is processed to determine ownership). Other implementations for identifying data repository and/or data object ownership by processing data within the data repository and/or metadata associated with the data repository will be, or will become, apparent to one with skill in the art upon examination of the following figures and detailed description. It is intended that all such additional implementations be included within this description, be included within the scope of the disclosure, and be protected by the following claims.

In accordance with a first aspect of the present disclosure, a computer-implemented method for identifying data repository ownership is provided. The computer-implemented method may be executed via any of a myriad of computing devices embodied in hardware, software, firmware, and/or a combination thereof, that performs the various operations of the computer-implemented method. One such example computer-implemented method includes identifying system access data associated with a data repository. The example computer-implemented method further includes determining system-based owner identification data for the data repository based at least in part on the system access data. The example computer-implemented method further includes retrieving, via a user linkage database, repository-based ownership information corresponding to the data repository based at least in part on the system-based owner identification data associated with the data repository. The example computer-implemented method further includes determining, via the user linkage database, ownership lineage data corresponding to the data repository based at least in part on the repository-based ownership information corresponding to the data repository.

Additionally or alternatively, in some embodiments of the example computer-implemented method, determining the system-based owner identification data based at least in part on the system access data comprises determining the system access data associated with the data repository identifies a single owner; and in a circumstance where the system access data associated with the data repository identifies the single owner, assigning the system-based owner identification data representing the single owner.

Additionally or alternatively, in some embodiments of the example computer-implemented method, determining the system-based owner identification data based at least in part on the system access data comprises determining the system access data associated with the data repository identifies no owner; and in a circumstance where the system access data associated with the data repository identifies no owner: executing a scanning process to identify a file data object set stored in the data repository, and user access information associated with each file data object of the file data object set; and identifying a prominent access user identifier based at least in part on the user access information associated with each file data object of the file data object set; and assigning the prominent access user identifier as the system-based owner identification data.

Additionally or alternatively, in some embodiments of the example computer-implemented method, determining the system-based owner identification data based at least in part on the system access data comprises determining the system access data associated with the data repository identifies a plurality of possible owners; and in a circumstance where the system access data associated with the data repository identifies a plurality of possible owners, executing a scanning process to identify a file data object set stored in the data repository, and user access information associated with each file data object of the file data object set; identifying a prominent access user identifier based at least in part on the user access information associated with each file data object of the file data object set; and assigning the prominent access user identifier as the system-based owner identification data.

Additionally or alternatively, in some embodiments of the example computer-implemented method, the example computer-implemented method further includes determining the system-based owner identification data based at least in part on the system access data comprises determining the system access data associated with the data repository identifies a plurality of possible owners; and in a circumstance where the system access data associated with the data repository identifies a plurality of possible owners, executing a scanning process to identify a file data object set stored in the data repository, and a file owner identifier set corresponding to the file data object set; determining a subset of possible owners from the plurality of possible owners that are not represented in the file owner identifier set; excluding the subset of possible owners from the plurality of possible owners to determine a remaining possible owner set; and identifying the system-based owner identification data based at least in part on the remaining possible owner set.

Additionally or alternatively, in some embodiments of the example computer-implemented method, the example computer-implemented method further includes providing, via at least one display, the ownership lineage data corresponding to the data repository.

Additionally or alternatively, in some embodiments of the example computer-implemented method, identifying the system access data comprises querying at least one computing system associated with the data repository for file system data associated with the data repository, wherein the system access data comprises the file system data.

Additionally or alternatively, in some embodiments of the example computer-implemented method, identifying the system access data comprises querying at least one computing system associated with the data repository for third-party service data associated with the data repository, wherein the system access data comprises the third-party service data.

In accordance with yet another aspect of the present disclosure, an apparatus for identifying data repository ownership is provided. In some example embodiments of the apparatus, the example apparatus includes at least one processor and at least one memory. The at least one memory has computer-coded instructions stored thereon that, in execution with the at least one processor, configure the apparatus for performing any one of the example computer-implemented methods described herein. Alternatively or additionally, in some example embodiments, the example apparatus includes means for performing each step of any one of the example computer-implemented methods described herein.

In accordance with yet another aspect of the present disclosure, a computer program product for identifying data repository ownership is provided. In some example embodiments of the computer program product, the example computer program product includes at least one non-transitory computer-readable storage medium having computer program code stored thereon. The computer program code in execution with at least one processor configures the computer program product for performing any one of the example computer-implemented methods described herein.

BRIEF DESCRIPTION OF THE DRAWINGS

Figure 1:
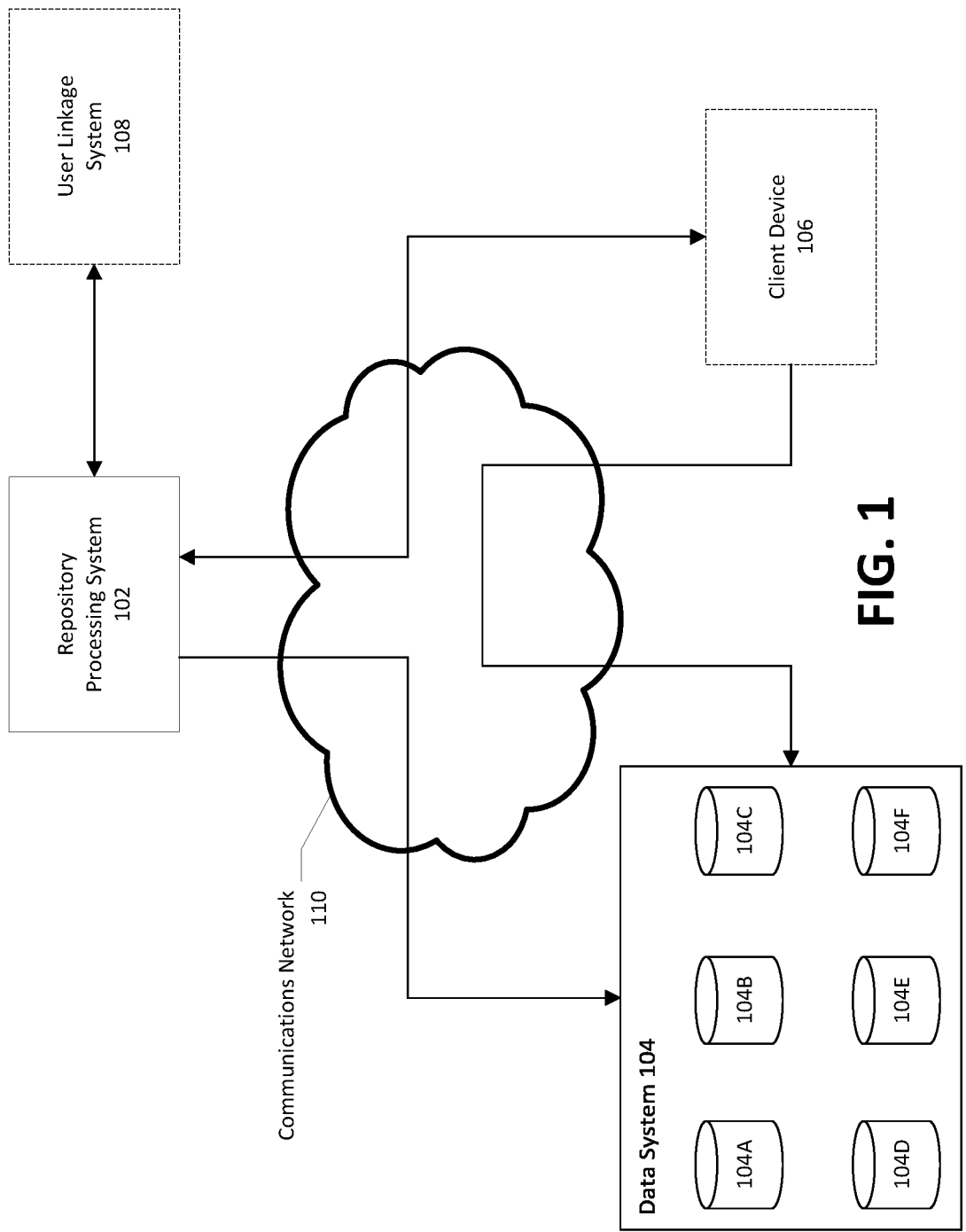
Figure 2:
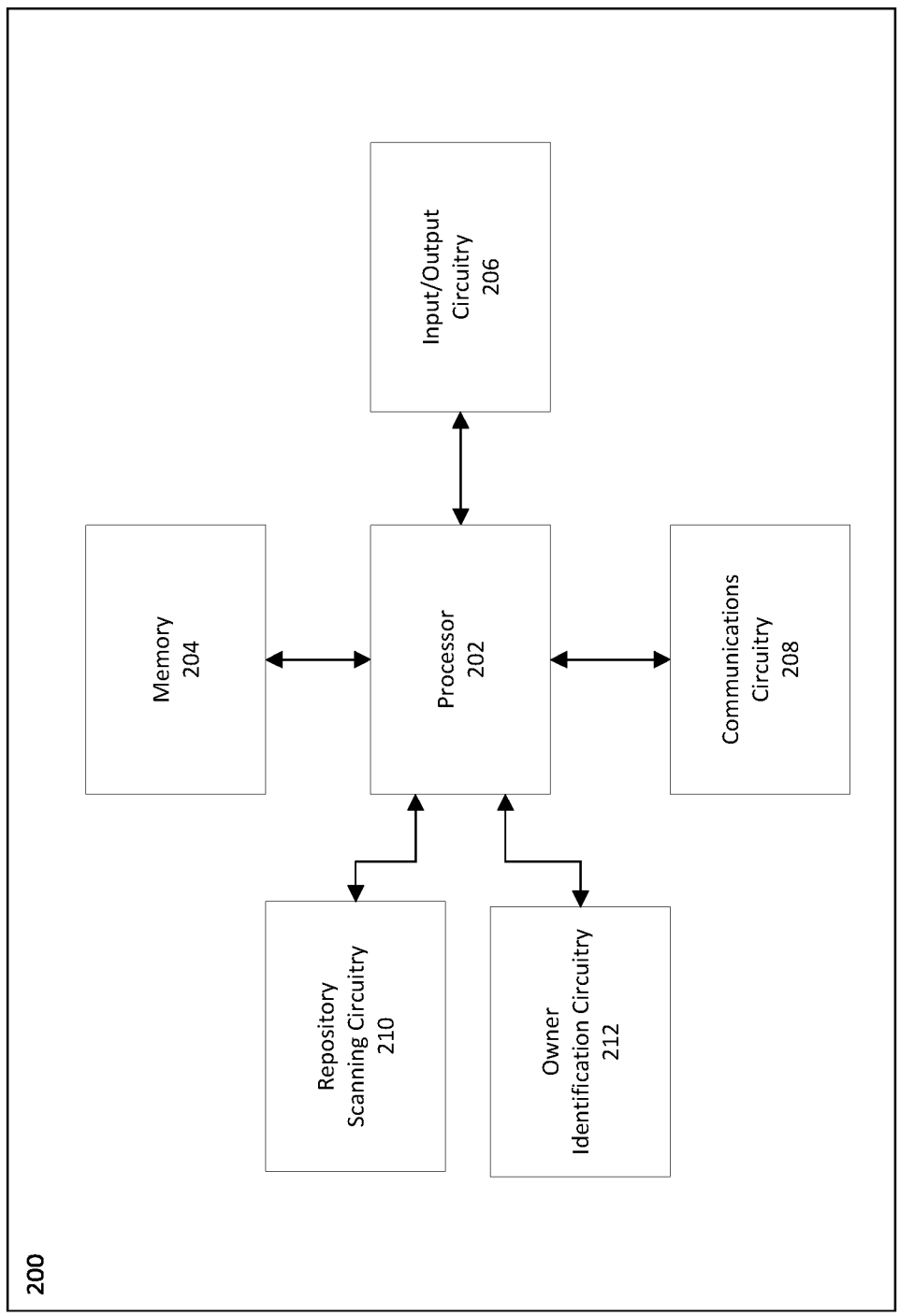
Figure 3:
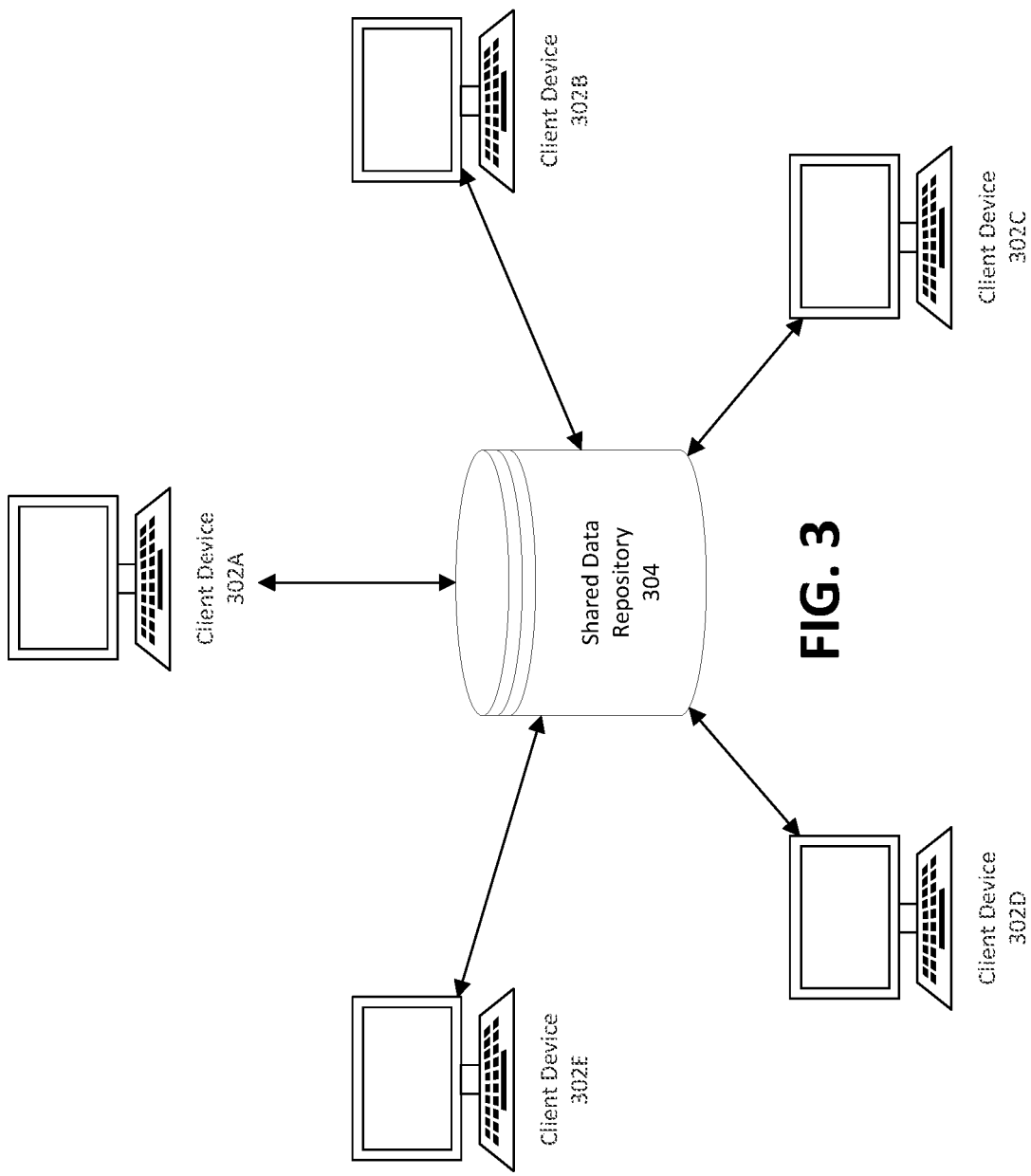
Figure 4:
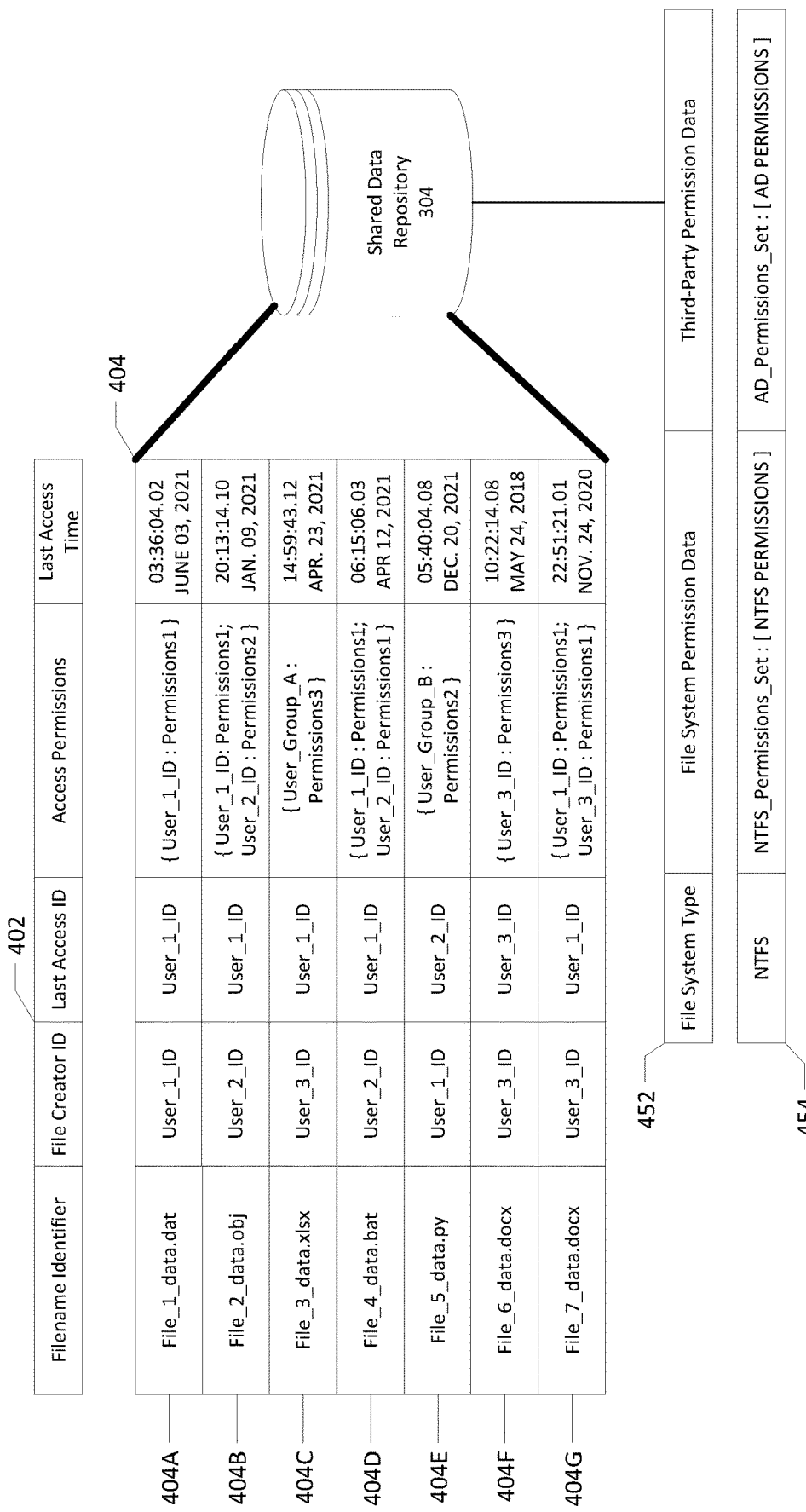
Figure 5:
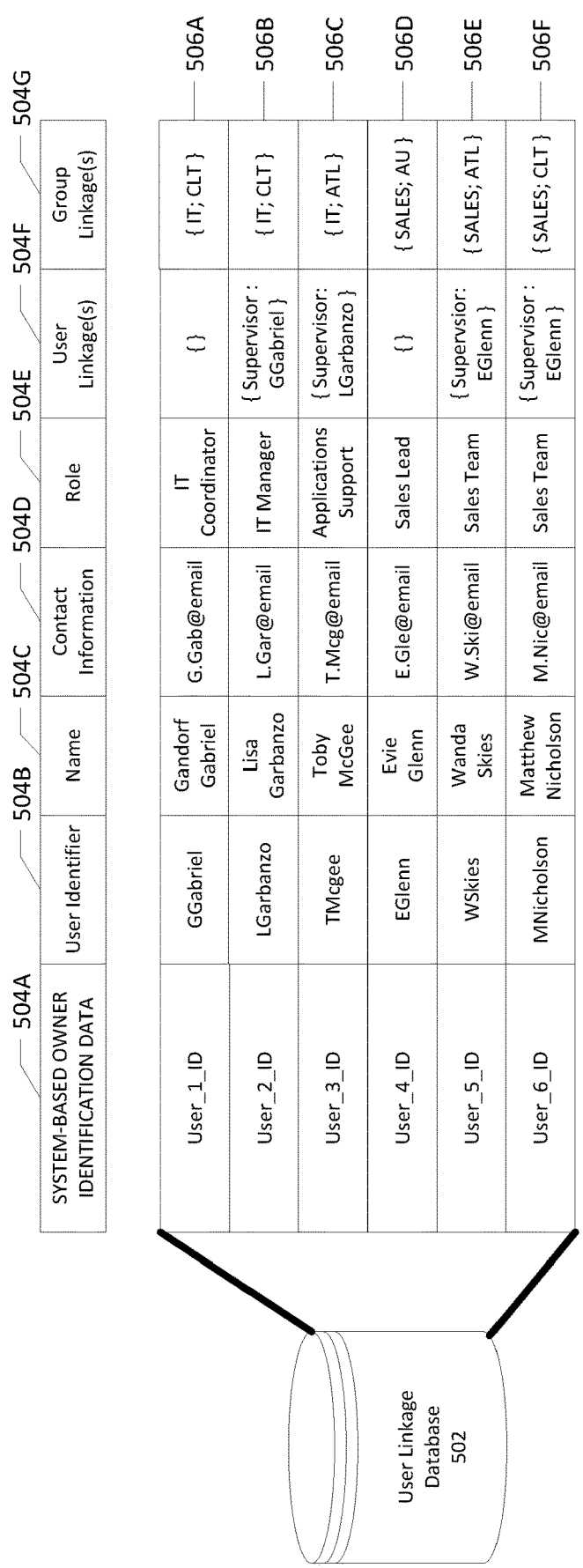
Figure 6:
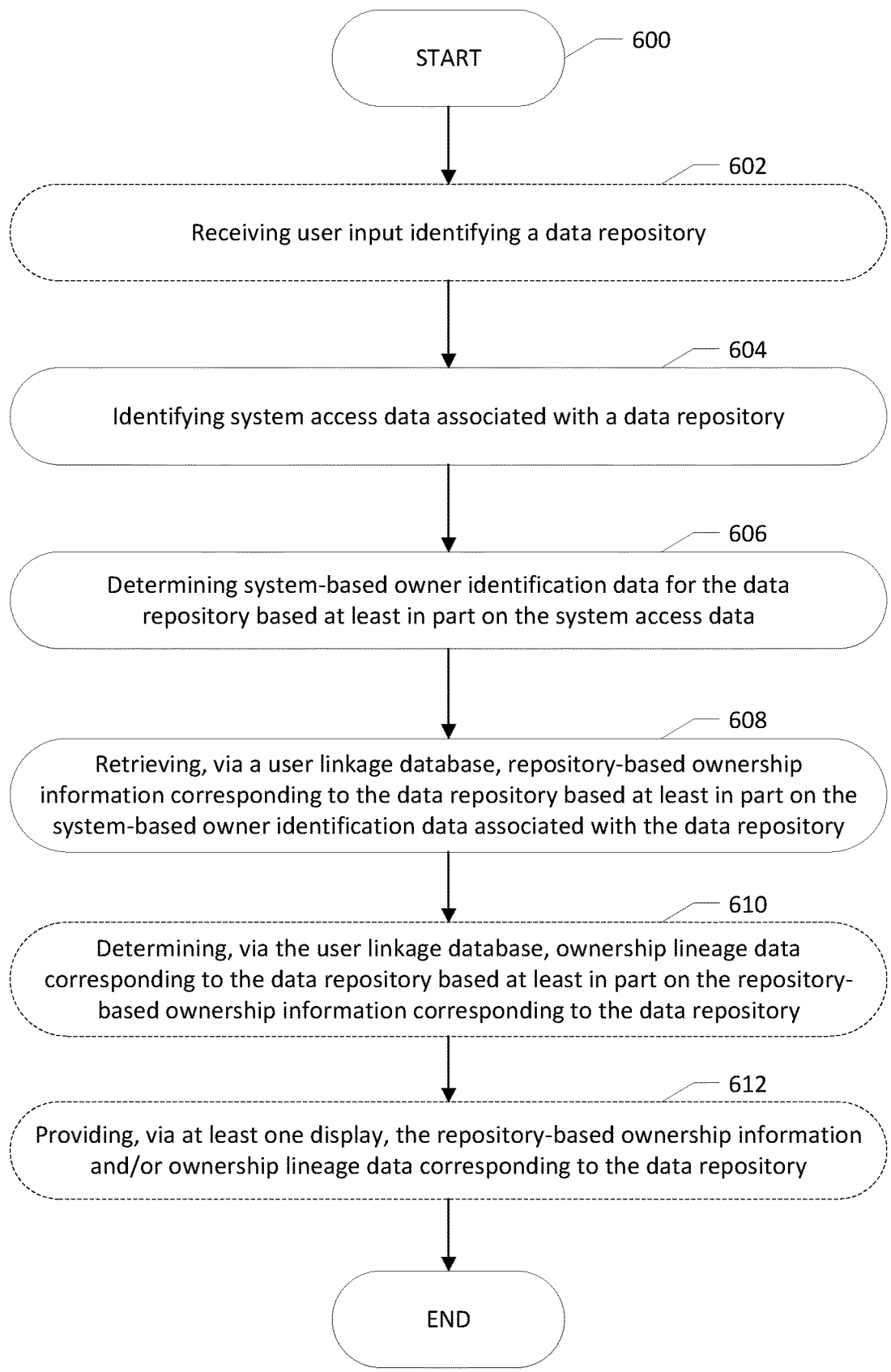
Figure 7:
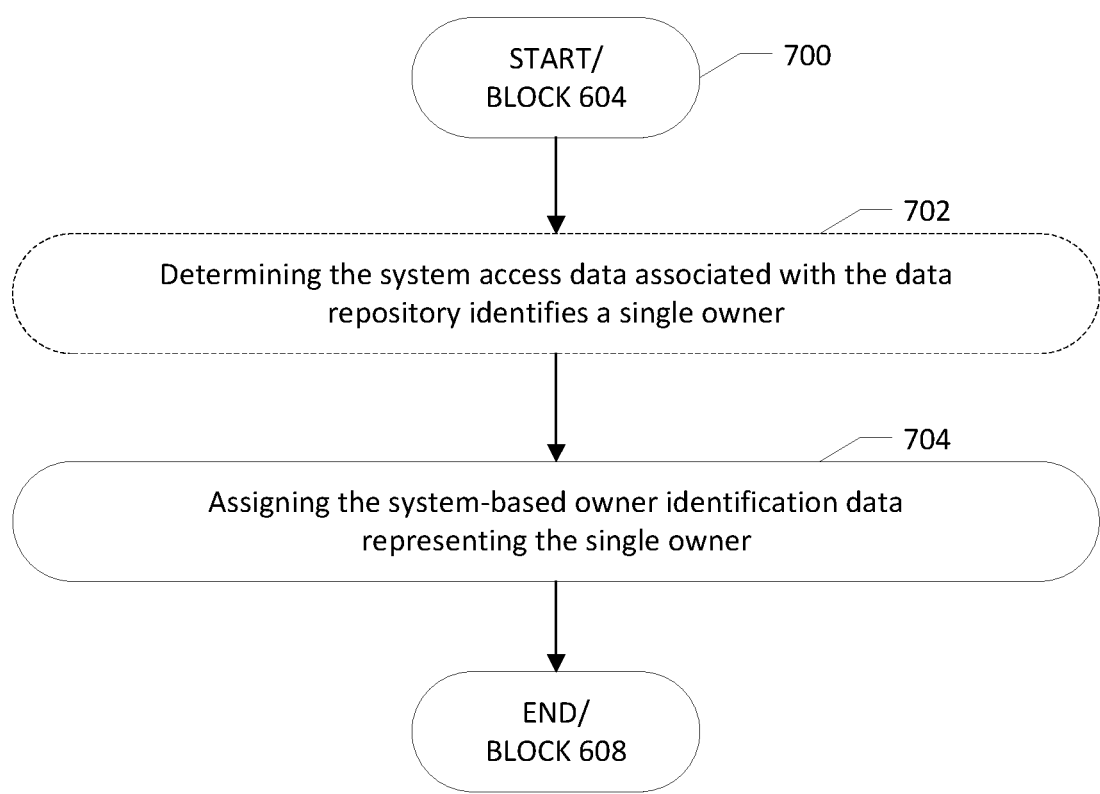
Figure 8:
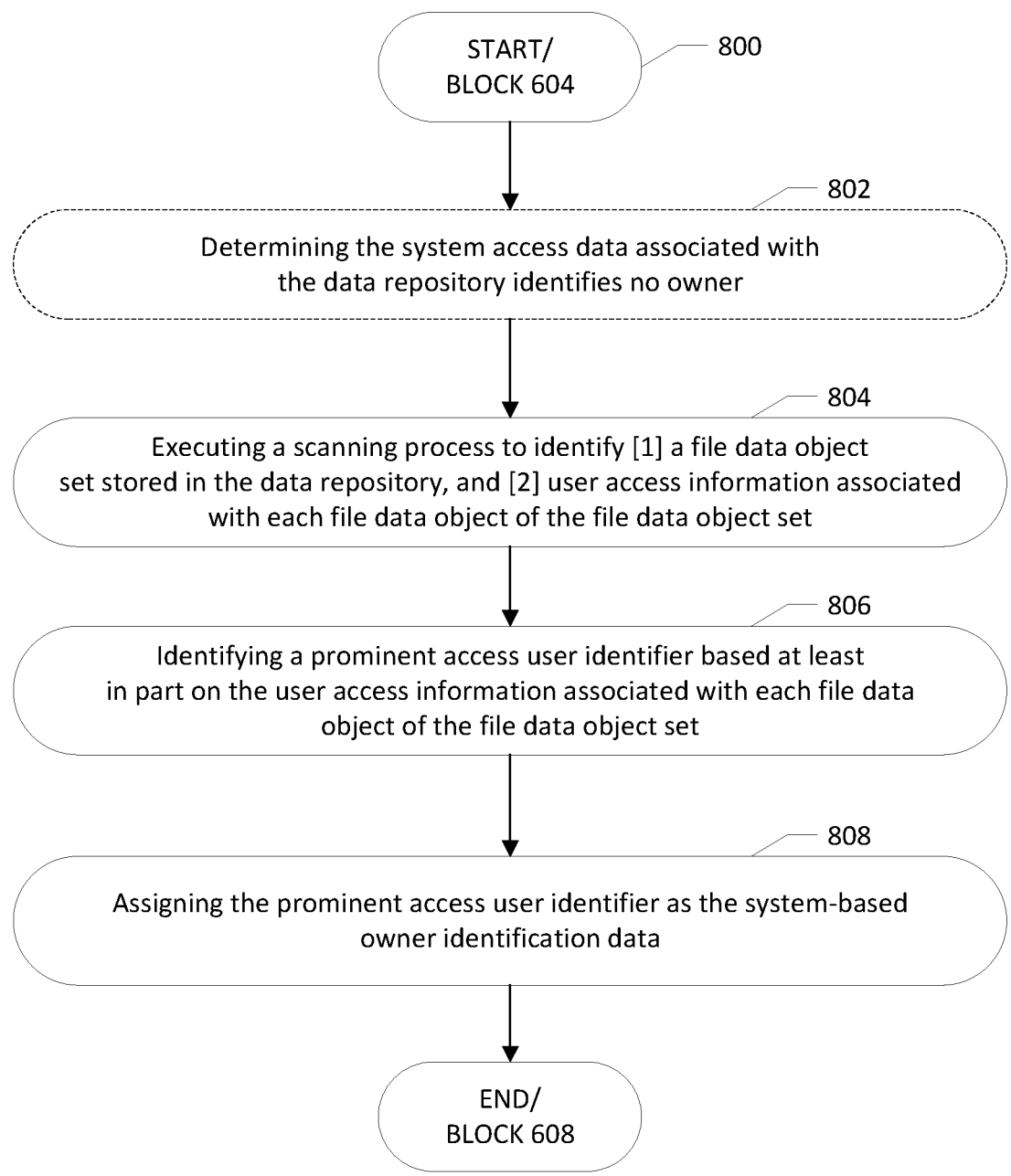
Figure 9:
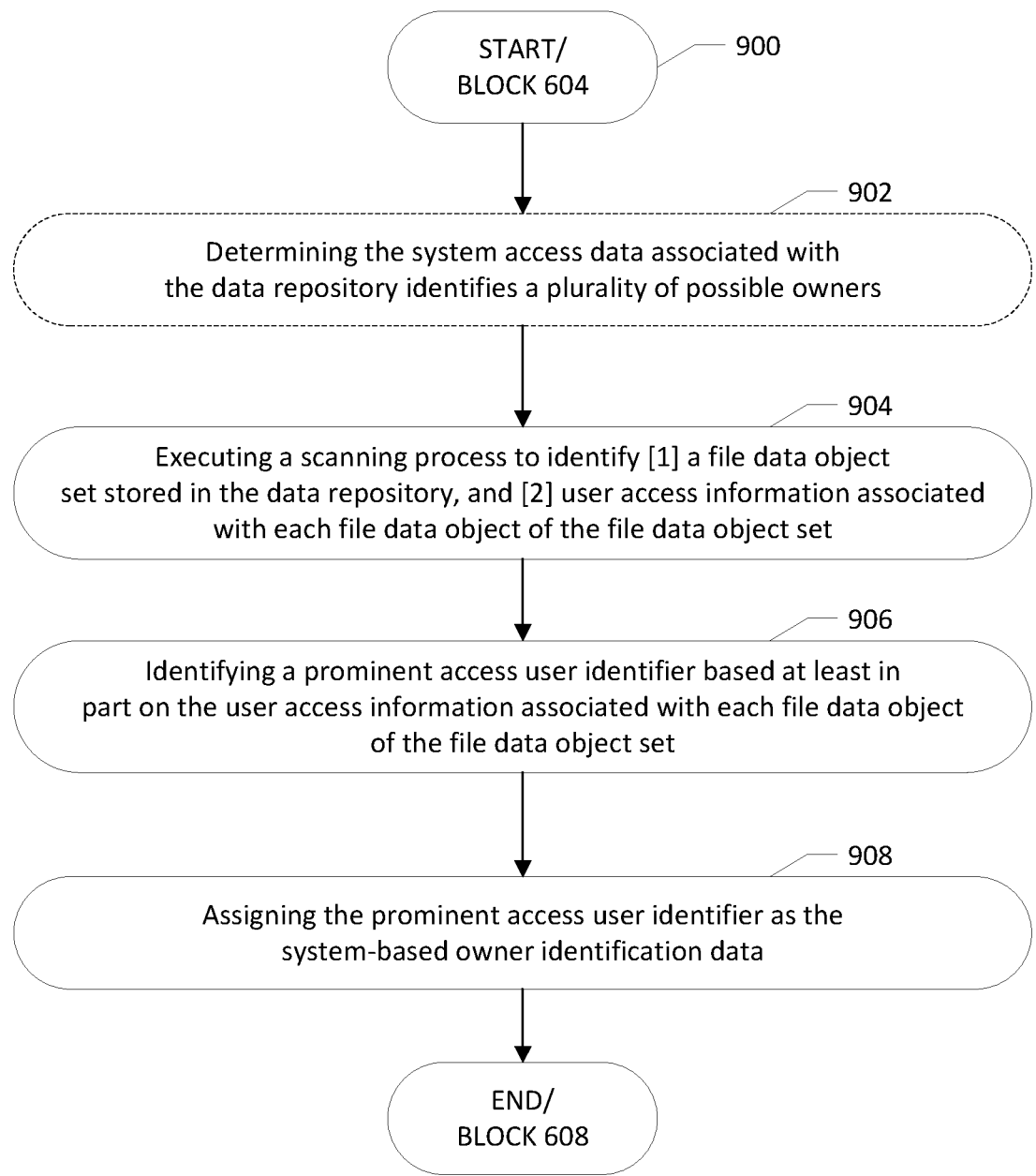
Figure 10:
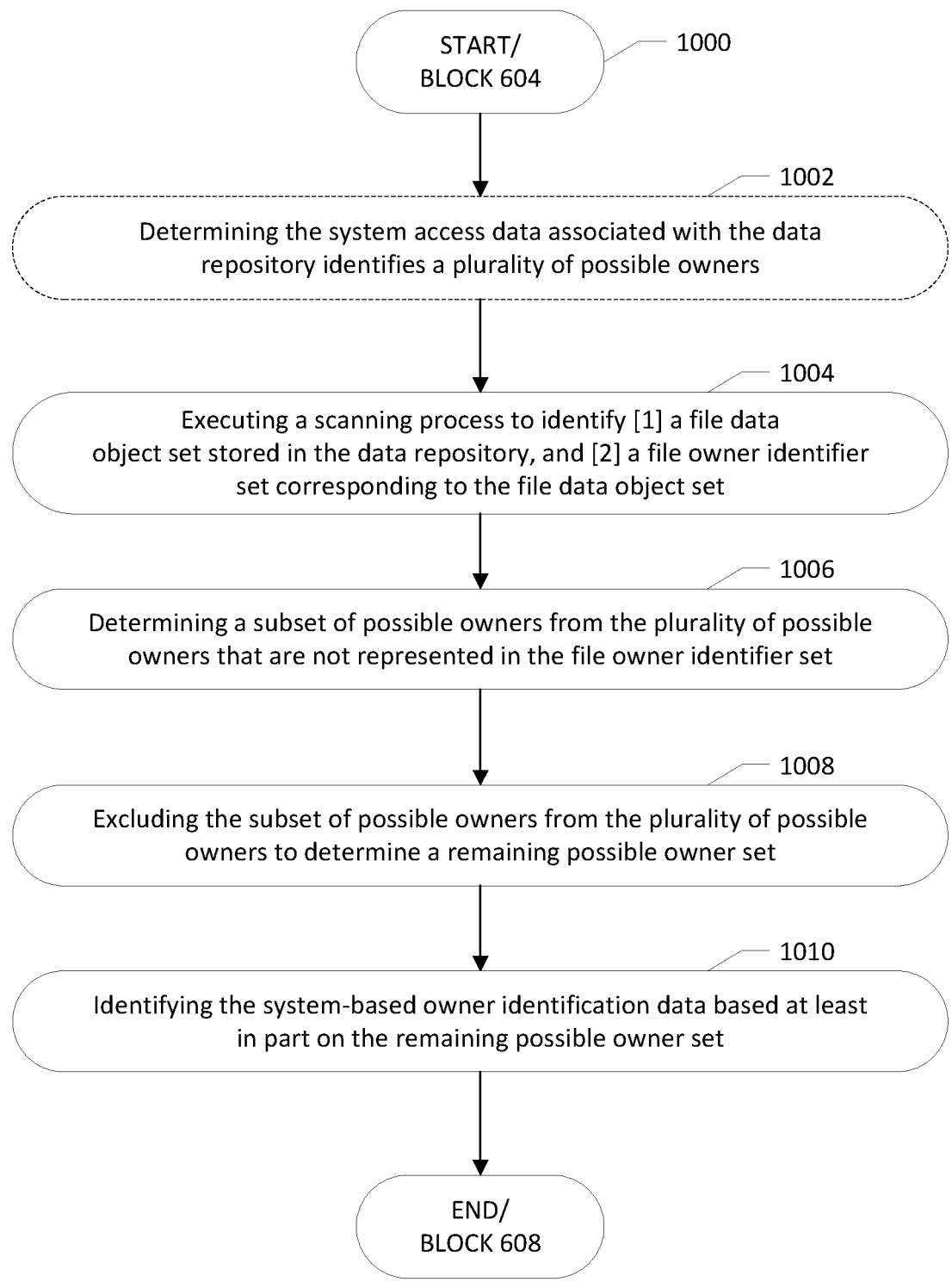
Figure 11:
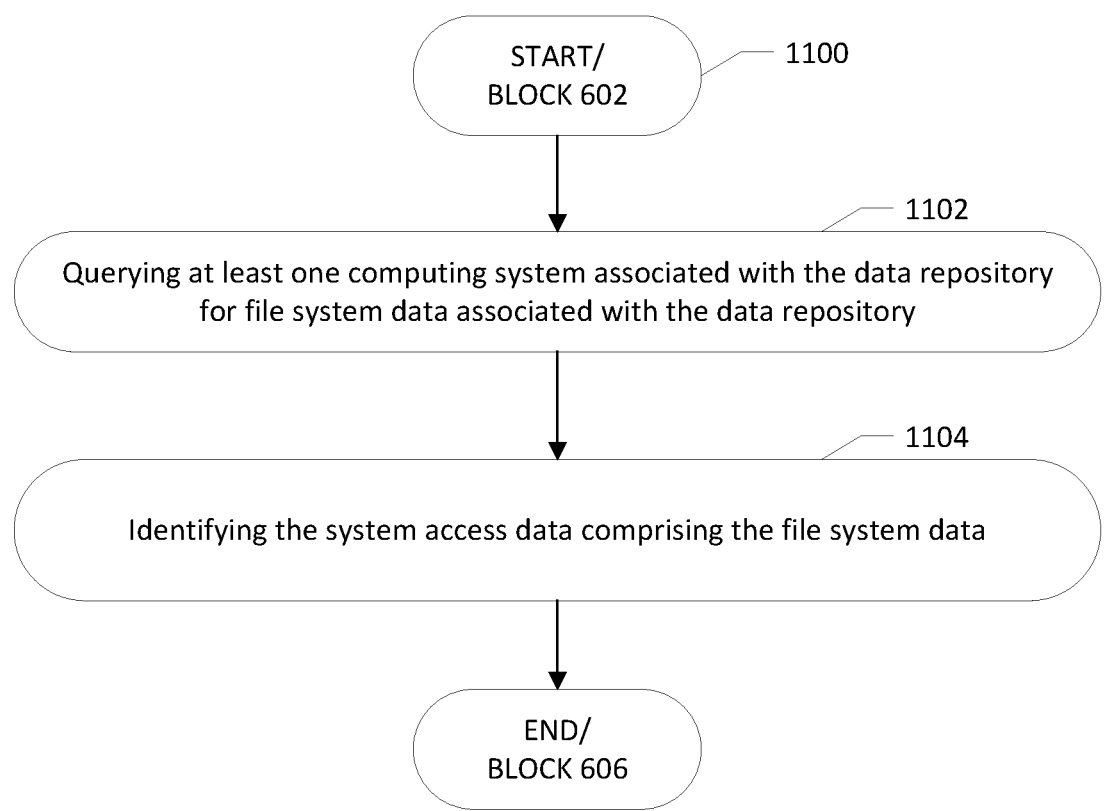
Figure 12:
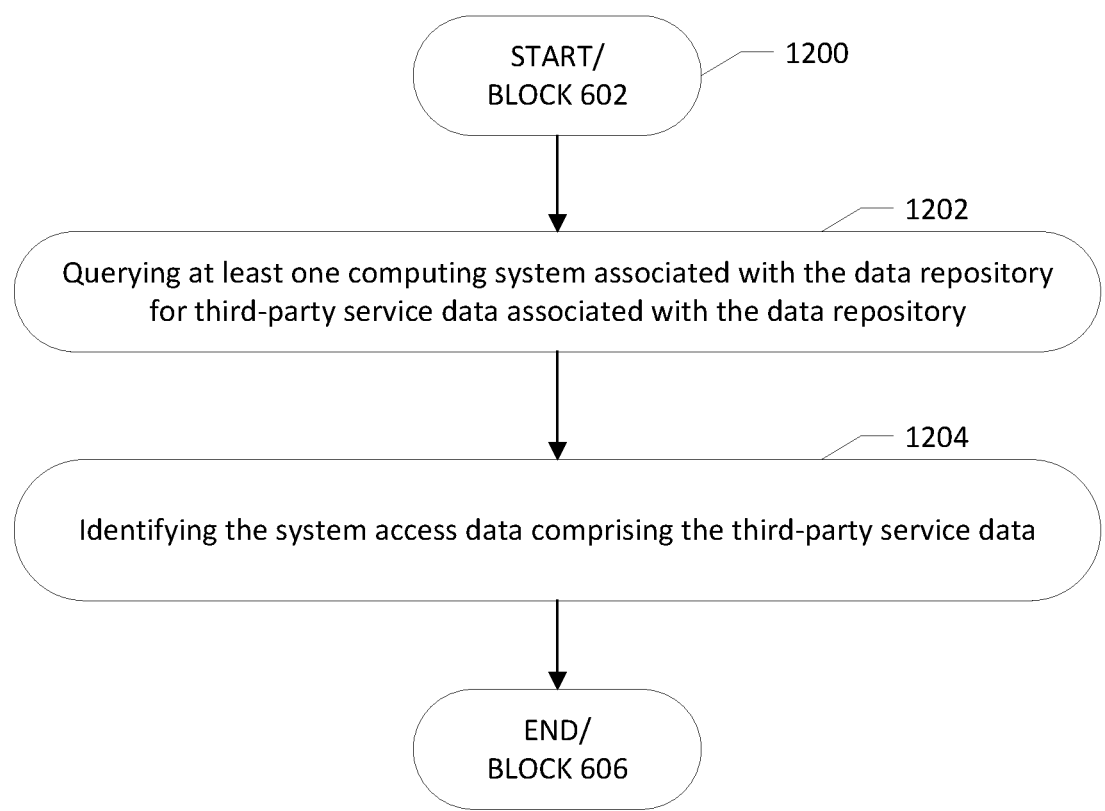

Having thus described the embodiments of the disclosure in general terms, reference now will be made to the accompanying drawings, which are not necessarily drawn to scale, and wherein:

FIG. 1 illustrates a block diagram of a system for improved data repository ownership identification that may be specially configured within which embodiments of the present disclosure may operate;

FIG. 2 illustrates a block diagram of an example repository processing apparatus that may be specially configured in accordance with at least some example embodiments of the present disclosure;

FIG. 3 illustrates a block diagram of an example data system for accessing a shared data repository in accordance with at least some example embodiments of the present disclosure;

FIG. 4 illustrates an example visualization of data stored via a shared data repository in accordance with at least some example embodiments of the present disclosure;

FIG. 5 illustrates an example visualization of data stored via a user linkage database in accordance with at least some example embodiments of the present disclosure;

FIG. 6 illustrates a flowchart depicting example operations of a process for identifying data repository ownership in accordance with at least some example embodiments of the present disclosure;

FIG. 7 illustrates a flowchart depicting additional example operations of a process for identifying data repository ownership in accordance with at least some example embodiments of the present disclosure;

FIG. 8 illustrates a flowchart depicting additional example operations of a process for identifying data repository ownership in accordance with at least some example embodiments of the present disclosure;

FIG. 9 illustrates a flowchart depicting additional example operations of a process for identifying data repository ownership in accordance with at least some example embodiments of the present disclosure;

FIG. 10 illustrates a flowchart depicting additional example operations of a process for identifying data repository ownership in accordance with at least some example embodiments of the present disclosure;

FIG. 11 illustrates a flowchart depicting additional example operations of a process for identifying data repository ownership in accordance with at least some example embodiments of the present disclosure; and FIG. 12 illustrates a flowchart depicting additional example operations of a process for identifying data repository ownership in accordance with at least some example embodiments of the present disclosure.

DETAILED DESCRIPTION

Embodiments of the present disclosure now will be described more fully hereinafter with reference to the accompanying drawings, in which some, but not all, embodiments of the disclosure are shown. Indeed, embodiments of the disclosure may be embodied in many different forms and should not be construed as limited to the embodiments set forth herein, rather, these embodiments are provided so that this disclosure will satisfy applicable legal requirements. Like numbers refer to like elements throughout.

Overview

Accurate determinations of ownership for data repositories, especially shared data repositories, is a core step in addressing many technical and business-related problems. For example, business continuity planning, document management, data management, end user computing tool identification, model identification, and several other use cases leverage an identified owner for one or more processing and/or reporting operations. Such use cases often assume or otherwise require accurate identification of an owner for a data repository to resolve and/or accomplish such process(es).

Conventional implementations that attempt to identify ownership of a data repository suffer from various shortcomings. Some implementations rely on manual assignment, interpretation, and/or assignment of an owner for a particular data repository. Such manual implementations often suffer from inaccuracies due to human error, failure to update relevant values, and/or missing data entries altogether, thus such implementations often are unusable or inaccurate for accomplishing the desired use case. Other conventional implementations, including attempted technical implementations, fail to sufficiently leverage data stored to and/or associated with a data repository to accurately identify a data repository owner, particularly in circumstances where such data fails to identify a single user or group. Additionally or alternatively still, conventional implementations that attempt to maintain ownership of a data repository entirely external from the data of the data repository itself (e.g., in a separate database, an HR database, and/or the like) quickly become out of date, especially in circumstances where data within the data repository is updateable by many users and/or users statuses change with relative commonality.

Embodiments of the present disclosure provide for improved data repository ownership identification. In this regard, embodiments of the present disclosure provide methodologies for accurately identifying an owner of a data repository and/or corresponding information, for example ownership lineage data associated with the data repository. Such identified owner and/or corresponding information may be utilized in any of a myriad of use cases, for example further processing, identifying information associated with the particular owner, and/or the like.

Some embodiments of the present disclosure accurately identify data repository ownership and/or corresponding information based on various data stored in the data repository and/or metadata associated with the data repository. For example, data repository ownership is identifiable based at least in part on system access data corresponding to the data repository, file data object(s) stored in the data repository, and/or the like. In this regard, various embodiments accurately identify data repository ownership regardless of whether such particular data associated with ownership of the data repository indicates no owner, one owner, or a plurality of owners. Additionally or alternatively, at least some embodiments of the present disclosure leverage a user linkage database to identify particular data associated with an owner of a data repository and/or linkages between an owner and other users. For example, such data may include owner lineage data utilized to complete one or more process(es) that otherwise leverage an owner of a data repository.

Embodiments of the present disclosure provide various technical advantages to various technical fields. For example, some or all embodiments of the present disclosure identify system-based owner identification data associated with a particular data repository based on data stored to and/or otherwise associated with configuration of the data repository. Additionally or alternatively, for example, some or all embodiments of the present disclosure leverage such system-based owner identification data to retrieve up-to-date ownership information and/or ownership lineage data from one or more external database(s). Such external database(s) may be maintained independently to keep the users represented in the external database current, whereas the system-based owner identification data is separately identified based on the most current data stored to and/or configuring the data repository to be processed. In this regard, accurate ownership of a particular data repository may be identified based on the system-based owner identification data identified from the data repository itself. Further, the data representing such accurately identified ownership for a data repository may be further utilized to retrieve the most up-to-date information for a user representing an owner and/or ownership lineage of the data repository from an external database. The external database information may embody the most up-to-date information associated with a single user represented explicitly by the system-based owner identification data for the data repository. Alternatively or additionally, the external database information may embody ownership lineage information that enables identification of alternative current owner(s) and/or new owner(s) for the data repository. Information stored to an external database, such as a user linkage database, may be highly trustworthy as part of ensuring that operations (e.g., business operations of a particular user group) are performable.

As such, embodiments of the present disclosure leverage particular data from interoperable yet separately maintained computing device(s) and/or system(s) to accurately identify information representing an owner of a particular data repository. The information is identified accurately regardless of whether the data stored and/or otherwise maintained associated with configuration of the data repository itself has become out-of-date or otherwise no longer accurate. Conventional systems that attempt to accurately identify ownership of a data repository fail to do so as information associated with the data repository and/or external databases become out-of-date. Thus, such up-to-date ownership information and/or ownership lineage data may be further processed for any of a myriad of actions, such as to notify the correct owner of information and/or action(s) to perform for a particular data repository, generate report(s) associated with ownership of one or more data repositories, and/or the like.

Embodiments of the present disclosure utilize data stored in and/or associated with a data repository to identify ownership of the data repository. In this regard, embodiments of the present disclosure are able to accurately identify such ownership in various circumstances where conventional implementations cannot accurately identify ownership of a particular data repository. For example, embodiments of the present disclosure determine ownership information and/or lineage data for a data repository even in circumstances where no known owner is readily identifiable from data properties (e.g., directory permission data, file system permission data, and/or the like) indicating such ownership and/or in circumstances where a plurality of possible owners is identifiable from such data properties.

Definitions

In some embodiments, some of the operations above may be modified or further amplified. Furthermore, in some embodiments, additional optional operations may be included. Modifications, amplifications, or additions to the operations above may be performed in any order and in any combination.

Many modifications and other embodiments of the disclosure set forth herein will come to mind to one skilled in the art to which this disclosure pertains having the benefit of the teachings presented in the foregoing description and the associated drawings. Therefore, it is to be understood that the embodiments are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The term "set" with respect to a particular type of data (e.g., a "set of data X" or a "data X set") refers to one or more data objects embodying or including any number of instances of the particular data set. For example, as described herein, a set of candidate files may include any number of candidate data objects, a set of scan criteria may include any number of individual scan criteria and the like.

The term "data system" refers to one or more computing devices embodied in hardware, software, firmware, and/or a combination thereof, that includes one or more data repositories accessible via client devices included in or that communicate with such computing devices. In some embodiments, file repositories of a particular system are interconnected such that client devices accessing the data system have access to some or all of the file repositories embodying part of the data system.

The term "data repository" refers to a specially configured database, memory, and/or other storage space embodied in hardware, software, firmware, and/or a combination thereof, that stores one or more files. Non-limiting examples of a data repository include a specially configured generic server device, database server, virtual server, cloud server, and a memory device local or connected to a client device.

The term "shared data repository" refers to a data repository accessible by various users corresponding to client device(s) interacting with or within a particular data system. In some such embodiments, all client devices having access to a shared data repository may be associated with particular permissions indicating whether each client device may read files stored to the shared data repository, and/or write files to the shared data repository. In some embodiments, a shared data repository is accessible to various client devices over one or more communications networks.

The term "user" refers to electronically managed data representing a particular entity, for example a person, business, group of persons, and/or other organization. In some embodiments, a user is represented by electronically managed data corresponding to a user account or user profile for the user.

The term "system access data" refers to electronically managed data that represents user permissions and/or access to a particular data repository. Such user and/or access permissions may include granted permissions to access, alter, update, interact with, and/or otherwise affect a particular file data object or group of file data objects. Non-limiting examples of system access data includes NTFS access permissions, read/write permissions, and other third-party service related and/or operating system-level file or repository management permissions.

The term "system-based owner identification data" refers to electronically managed data made available via the data repository and/or an associated system for accessing or configuring the data repository that identifies owner(s) of the data repository and/or file data object(s) therein. In some embodiments, system-based owner identification data is determinable from and/or represented by management permissions, access permissions, and/or initiated actions corresponding to a particular data repository.

The term "owner" refers to a user or group of users that is permissioned or otherwise identified as an appropriate entity to access, manipulate, and/or otherwise initiate actions associated with management of a particular data repository. An owner may be identified from a particular source of truth that stores information associated with user(s) and/or user group(s), and/or that stores associations between user(s) and/or user group(s). In some embodiments, a user is an owner of all data repositories for which the user exists within a higher position within an ownership lineage of another user that is owner of the data repository.

The term "ownership information" refers to electronically managed data that represents information for a particular user or user group maintained by a user linkage database that indicates properties identified as an owner of a particular data repository.

The term "ownership lineage data" refers to electronically managed data that represents connections between ownership information associated with a particular user or user group and one or more other users or user groups. Non-limiting examples of ownership lineage data includes data linking a particular user to one or more other users (e.g., supervisory users, manager users, administrative users, and/or the like), and/or data linking a particular user with a particular user group (e.g., a user group embodying a business unit, a line of business, an organization, and/or the like), and/or data linking a particular user group associated with a particular user with another user group (e.g., a parent organization for a user group with which a user is associated).

The term "single owner" refers to data that identifies one user or user group as an owner of a particular file data object or data repository.

The term "no owner" refers to data that identifies no user or user group as an owner of a particular file data object or data repository.

The term "scanning process" refers to one or more executable process(es) for identifying and/or processing metadata and/or data associated with some or all file data objects stored to a data repository. The term "efficient scanning process" refers to one or more scanning process (es) that executes for a statistically significant number of file data object(s) (e.g., millions, billions, or more files conventionally not able to be completed through scanning all data properties for such file data object(s) of a data repository in a single phase. In some embodiments, an efficient scanning process comprises one or more sub-phases that reduces the total computing time required to complete the efficient scanning process, such that the total computing time required to complete the efficient scanning process is below a threshold time interval that enables the results of the efficient scanning process to be identified within a usable time frame.

The term "scan criteria" refers to a comparison, model, or algorithm performed as part of an efficient scanning process that outputs data indicating a likelihood or determination of whether a particular file data object satisfies such a comparison, model, or algorithm. In some embodiments, scan criteria embodies an algorithmic determination based on one or more data properties to identify a subset of stored file data objects that satisfy the algorithmic determination.

The term "file data object" refers to electronically managed data embodying a file stored to at least one data repository. The term "file data object set" when used with respect to a particular data repository refers any number of file data object(s) stored within the particular data repository.

The term "user access information" refers to electronically managed data indicating a user identifier that last accessed, updated, manipulated, and/or otherwise engaged with a particular file data object stored to a particular data repository. In some embodiments, user access information indicates a "last modified" user identifier that uniquely represents the user account that last modified the file data object. User access information may be maintained by the data repository and/or an operating system or other application associated therewith.

The term "prominent access user identifier" refers to electronically managed data that uniquely identifies a user or a user group determined to be an owner of a data repository and/or file data object(s) thereof based on user access information corresponding to one or more file data object(s) of the data repository. In some embodiments, the prominent access user identifier corresponds to a user or user group that is indicated by one or more portion of user access information owns, accesses, creates, and/or otherwise interacts with the largest number of data objects stored in a data repository or set of data repositories over a particular time frame.

The term "data property" with respect to a particular file data object refers to a particular portion of metadata associated with the file data object and/or a particular portion of the content of the file data object. Each data property for a file data object may be associated with a particular data value, which may differ for each file data object depending on the particularities of each file data object. Non-limiting examples of a data property for a particular file data object include a filename, a file type, a file content length, a file size, a file content title, a file author, a last-accessed datetime, a file created datetime, a file storage location, and file permissions data.

The term "file detail data" refers to electronically managed data representing any number of data properties of a particular file data object and/or associated values for such data properties. It should be appreciated that file detail data may be embodied in a single data object comprising one or more data properties and corresponding data value(s), and/or multiple data objects.

The term "owner identifier" refers to electronically managed data that uniquely identifies a user indicated as an owner for a particular file data object or set of file data objects. The term "file owner identifier set" refers to any number of file owner identifiers corresponding to any number of file data objects stored within a data repository or plurality of data repositories.

The term "possible owner" refers to electronically managed data that identifies a particular user or set of users that are indicated as associated with a probability or likelihood that the user or set of users are an owner of a particular file data object or data repository.

The term "subset of possible owners" refers to electronically managed data that represents a set of possible owners with zero or more possible owners removed from the set based at least in part on data, or a determined lack of particular data, indicating the user is not or likely not an owner.

The term "remaining possible owner set" refers to a set of possible owners with a subset of possible owners removed.

The term "file system data" refers to configuration, journaling, and/or other data utilized by a data repository, and/or utilized to configure a data repository.

The term "third-party service data" refers to electronically-driven service, process, or system maintained or otherwise made available by a third-party entity distinct from a particular entity controlling a data repository.

Example Systems of the Disclosure

FIG. 1 illustrates a block diagram of a system for improved data repository ownership identification that may be specially configured within which embodiments of the present disclosure may operate. As illustrated, the system for improved target file scanning includes a repository processing system 102, a data system 104, an optional client device 106, and an optional user linkage system 108. Additionally or alternatively, in some embodiments, the repository processing system 102, data system 104, client device 106, and user linkage system 108 communicate over one or more communication network(s), such as the communications network 110 as depicted and described herein. In this regard, the various devices and systems depicted and described with respect to FIG. 1 may communicate to provide the improved data repository ownership identification functionality described herein.

Client device 106 includes one or more computing devices embodied in hardware, software, firmware, and/or the like, or a combination thereof, accessible to a user for accessing particular functionality provided by the data system 104 and/or the repository processing system 102 alone or in conjunction with the other devices and/or systems depicted and described. In some embodiments, the client device 106 comprises an edge terminal (e.g., a user's workstation, personal computer, mobile device, and/or the like) that is configured to communicate with the data system 104 via a particular network. Alternatively or additionally, in some embodiments, the client device 106 is a part of the data system 104 (e.g., a node on an internal network comprising various sub-systems and/or devices). Non-limiting examples of a client device 106 include a smartphone, a mobile device, a personal computer, an enterprise terminal, and/or the like, that utilize a specially configured software application to perform and/or access the improved repository ownership identification functionality described herein. In some embodiments, the client device 106 is specially configured to execute a user-facing application that performs and/or provides access to such functionality natively and/or via any number of application programming interface (API) calls or other request transmissions to one or more external systems, such as the repository processing system 102 and/or data system 104. In some other embodiments, the repository processing system 102 functions in response to user engagement directly with the repository processing system 102, such that the repository processing system 102 functions as the client device 106 for purposes of accessing functionality of the repository processing system 102 and/or the data system 104.

Data system 104 includes one or more computing devices embodied in hardware, software, firmware, and/or the like, or a combination thereof, that is configured to at least store file data objects in one or more data repositories for access by one or more users via corresponding client device(s), such as the client device 106. In some embodiments, the data system 104 is specially configured to provide additional functionality separate to the storage and/or maintenance of file data objects to one or more data repositories. For example, in some embodiments, the data system 104 additionally includes one or more application servers, specially configured computing devices that perform particular processing functionality associated with the file data object(s), service functionality, and/or the like. For example, the data system 104 may embody an internal system providing access to various shared repositories, application(s), and/or the like, to the client device(s) on an internal network.

As illustrated, the data system 104 includes a plurality of data repositories 104A-104F. Each of the file repositories may be specially configured to store any number of file data objects and/or other data. For example, in some embodiments, each of the data repositories 104A-104F embodies a separate virtual or physical memory space that defines the location to which such file data objects are to be stored. Physical memory spaces may include servers(s), hard drive (s), and/or other memory device(s) located in area(s) owned by a particular entity that operates the data system 104 and/or area(s) owned by third-party entities that enable the entity that owns the data system 104 access to the device(s) in the area physically and/or over a network.

Each of the data repositories 104A-104F may include any number of sub-repositories, folders, and/or the like that further defines the structure of stored data within the data repository. For example, in some embodiments, a data repository may be specially configured in accordance with a particular file system that organizes stored file data objects in a particular manner, data format, and/or location. In some embodiments, one or more users (e.g., administrators or in some embodiments other users) may alter the configuration of one or more data repository and/or the file system associated therewith.

Additionally or alternatively, in some embodiments, the data system 104 includes one or more shared data repositories. The file data objects stored to the shared data repository may be accessible to various client devices authorized for communication with the data system 104 and/or the particular shared data repository. For example, in an instance where a user utilizing the client device 106 has access to the shared data repository, the user may select file data objects from the shared data repository to access them (e.g., read the data to the client device 106) and/or write file data object(s) to the shared data repository. In an example context, for example, the data repositories 104A, 104B, 104C, 104D, and 104E may each represent shared data repositories for use by different users and/or user groups, such as members of different business units of a particular entity. In this regard, users that authenticate themselves as associated with a particular user group (e.g., business unit) via their corresponding client device 106 to access the file data objects located on the shared data repository that are accessible to the user group of which the user is a member (e.g., file data objects that users of the business unit are permitted to access). The user of the client device 106 may interact with the data system 104 to perform any of a number of actions associated with functionality provided by the data system 104 and/or to access and/or utilize file data objects stored to one or more of the data repositories 104A-104F.

The repository processing system 102 includes one or more specially configured computing devices configured in hardware, software, firmware, and/or the like, or a combination thereof, to initiate and/or perform various operations associated with the improved data repository ownership identification functionality described herein. For example, in some embodiments, the repository processing system 102 communicates with the data system 104 to enable identification of an owner associated with a particular data repository and/or identification of information associated therewith. The repository processing system 102 may include any number of database servers, application servers, personal computing devices, networking devices, and/or the like that are specially configured to perform the functionality described herein.

In some embodiments, the repository processing system 102 is communicable with the client device 106 to enable a user of the client device 106 to initiate one or more process(es) to identify ownership (e.g., ownership information and/or ownership lineage information) of a particular data repository. For example, in some embodiments, the user of the client device 106 initiates a client-facing application that enables access to one or more user interfaces for initiating such functionality. Additionally or alternatively, in some embodiments, the repository processing system 102 includes one or more computing devices (e.g., application servers and/or corresponding database servers, and/or the like) that access the data system 104 to identify file data objects stored on one or more data repositories thereof, process data and/or metadata associated with one or more data repositories thereof, perform scanning of file data objects stored to one or more data repositories thereof, and/or the like. In this regard, the repository processing system 102 may enable a user to access any of the functionality described herein for identifying data repository ownership, and/or leveraging the resulting data of said functionality.

Additionally or alternatively, in some embodiments, the repository processing system 102 is configured to automatically initiate one or more process(es) for identifying ownership of a particular data repository. In some example contexts, the repository processing system 102 may automatically initiate identification of ownership for a particular repository as a sub-process of other functionality. For example, in circumstances where a user initiates a process for processing data associated with a particular data repository, a particular user and/or user group, and/or the like, the repository processing system 102 may initiate the described processes to identify ownership of a particular data repository (e.g., a shared data repository). Data representing such ownership may subsequently be utilized for further processing, such as to retrieve file data objects associated with data repositories owned by a particular user or user group, notify appropriate user(s) of particular action(s) corresponding to data repositories that the user owns, and/or the like. In yet other embodiments, another system providing access to particular application functionality leverages communication with the repository processing system 102 to initiate the process for identifying ownership of a data repository, and utilizes the data resulting therefrom.

It should be appreciated that, in some embodiments, the repository processing system 102 is controlled, operated, and/or otherwise owned by the same entity that controls, operates, and/or otherwise owns the data system 104. In other embodiments, the repository processing system 102 is controlled, operated, and/or otherwise owned by a different entity owning the data system 104 and/or leveraging the results of such functionality for identifying ownership of a data repository. For example, in some embodiments, the repository processing system 102 provides a cloud service for scanning data repositories and/or identifying ownership of data repositories owned by a third-party entity. Alternatively or additionally, in some embodiments, the repository processing system 102 provides a cloud service for scanning remote data repositories and/or identifying ownership of remote data repositories, and/or enabling access to the results of such scanning and/or identifying for processing by a third-party entity.

In some embodiments, the repository processing system 102 performs the improved data repository ownership functionality described herein at particular times. The repository processing system 102 may initiate identification of ownership for data repositories of the data system 104 at predetermined intervals (e.g., daily, weekly, quarterly, and/or the like). For example, the repository processing system 102 may perform such process(es) to update data indicating ownership of one or more data repositories at the predefined intervals, such that the stored data indicating ownership of one or more data repositories remains up to date. In other embodiments, the repository processing system 102 initiates identification of ownership for data repositories of the data system 104 in response to user engagement via the client device 106 requesting or otherwise initiating such process (es). In yet other embodiments, the repository processing system 102 performs one or more determinations and initiates identification of ownership for data repositories of the data system 104 in response to such determinations. For example, the repository processing system 102 may determine that a particular length of time has passed since the process(es) were last executed or determine data request(s) from a third-party system leverage the results of such process(es), and initiates the process(es) as described herein upon such determinations.

The user linkage system 108 comprises any number of computing devices embodied in hardware, software, firmware, and/or a combination thereof, that maintains one or more user linkage database(s) accessible to the repository processing system 102. The user linkage database(s) maintained thereby may store various information associated with users and/or user groups, linkages between users, linkages between user groups, and/or the like. In this regard, the user linkage database(s) may embody personnel database(s) maintained associated with a particular entity (e.g., an organization). The user linkage system 108 may be accessed directly by one or more user(s) authorized to make changes to the user linkage database(s) maintained thereby. For example one or more administrators, moderators, and/or other users may be authenticated to add data associated with a user or a user group, delete data associated with a user or user group, generate or delete linkages between users and/or user groups, and/or the like. The user linkage system 108 may include any number of application server(s), database server(s), and/or other devices configured to perform such functionality.

In some embodiments, the user linkage system 108 is separate from the repository processing system 102, such that the repository processing system 102 communicates with the user linkage system 108 over one or more communication networks, such as the communications network 110 and/or a separate communications network. In other embodiments, the user linkage system 108 is embodied as part of the repository processing system 102 (e.g., as a sub-system of the repository processing system 102). In some such embodiments, the user linkage system 108 may be accessed directly, for example to enable the repository processing system 102 to directly access a user linkage database.

The communications network 110 comprises any combination of computing devices embodying a public, private, and/or hybrid computing network over a particular range. In some embodiments, the communications network 110 is embodied by one or more network access points, relays, base stations, data transmission devices, cellular communication towers, and/or other communication devices. In some embodiments, the communications network 110 includes any number of user-owned and/or non-user computing devices facilitating access to and/or embodying a public network, such as the Internet. Additionally or alternatively, in some embodiments, the communications network 110 includes one or more computing devices of a user's local network, for example one or more network access point(s) such as a modem and/or router that enable access to a public, private, or hybrid network of computing devices. It should be appreciated that communications network 110 may be accessible via any of a myriad of communication mechanisms and/or protocols, including without limitation a wired connection, a Wi-Fi connection, a cellular connection, Bluetooth, and/or the like.

Example Apparatuses of the Disclosure

FIG. 2 illustrates a block diagram of an example repository processing apparatus that may be specially configured in accordance with an example embodiment of the present disclosure. In some embodiments, the repository processing system 102 is embodied by one or more computing systems, such as the repository processing apparatus 200 as depicted and described in FIG. 2. The repository processing apparatus 200 includes processor 202, memory 204, input/output circuitry 206, communications circuitry 208, repository scanning circuitry 210, and/or owner identification circuitry 212. The repository processing apparatus 200 may be configured, using one or more of the sets of circuitry 202, 204, 206, 208, 210, and/or 212, to execute the operations described herein.

Although components are described with respect to functional limitations, it should be understood that the particular implementations necessarily include the user of particular computing hardware. It should also be understood that certain of the components described herein may include similar or common hardware. For example, two sets of circuitry may both leverage use of the same processor(s), network interface(s), storage medium(s), and/or the like, to perform their associated functions, such that duplicate hardware is not required for each set of circuitry. The user of the term "circuitry" as used herein with respect to components of the apparatuses described herein should therefore be understood to include particular hardware configured to perform the functions associated with the particular circuitry as described herein.

Particularly, the term "circuitry" should be understood broadly to include hardware and, in some embodiments, software for configuring the hardware. For example, in some embodiments, "circuitry" includes processing circuitry, storage media, network interfaces, input/output devices, and/or the like. Alternatively or additionally, in some embodiments, other elements of the repository processing apparatus 200 may provide or supplement the functionality of another particular set of circuitry. For example, the processor 202 in some embodiments provides processing functionality to any of the sets of circuitry, the memory 204 provides storage functionality to any of the sets of circuitry, the communications circuitry 208 provides network interface functionality to any of the sets of circuitry, and/or the like.

In some embodiments, the processor 202 (and/or co-processor or any other processing circuitry assisting or otherwise associated with the processor) may be in communication with the memory 204 via a bus for passing information among components of the repository processing apparatus 200. In some embodiments, for example, the memory 204 is non-transitory and may include, for example, one or more volatile and/or non-volatile memories. In other words, for example, the memory 204 in some embodiments includes or embodies an electronic storage device (e.g., a computer readable storage medium). In some embodiments, the memory 204 is configured to store information, data, content, applications, instructions, or the like, for enabling the repository processing apparatus 200 to carry out various functions in accordance with example embodiments of the present disclosure.

The processor 202 may be embodied in a number of different ways. For example, in some example embodiments, the processor 202 includes one or more processing devices configured to perform independently. Additionally or alternatively, in some embodiments, the processor 202 includes one or more processor(s) configured in tandem via a bus to enable independent execution of instructions, pipelining, and/or multithreading. The use of the terms "processor" and "processing circuitry" may be understood to include a single core processor, a multi-core processor, multiple processors internal to the repository processing apparatus 200, and/or one or more remote or "cloud" processor(s) external to the repository processing apparatus 200.

In an example embodiment, the processor 202 may be configured to execute instructions stored in the memory 204 or otherwise accessible to the processor. Alternatively or additionally, the processor 202 in some embodiments is configured to execute hard-coded functionality. As such, whether configured by hardware or software methods, or by a combination thereof, the processor 202 may represent an entity (e.g., physically embodied in circuitry) capable of performing operations according to an embodiment of the present disclosure while configured accordingly. Alternatively or additionally, as another example in some example embodiments, when the processor 202 is embodied as an executor of software instructions, the instructions may specifically configure the processor 202 to perform the algorithms embodied in the specific operations described herein when such instructions are executed.

As one particular example, the processor 202 may be configured to perform various operations associated with improved target file scanning functionality, for example as described with respect to the repository processing system 102 and/or as described further herein. In some embodiments, the processor 202 includes hardware, software, firmware, and/or a combination thereof, that identifies and/or receives indications of data repositories to be processed. Additionally or alternatively, in some embodiments, the processor 202 includes hardware, software, firmware, and/or a combination thereof, that performs one or more process(es) for identifying ownership of said one or more identified data repositories. For example, in some embodiments, the processor 202 includes hardware, software, firmware, and/or a combination thereof, that identifies and/or scans for data and/or metadata associated with one or more data repositories, and/or process(es) such data to identify ownership of said repositories as described herein. In some such embodiments, the processor 202 is configured to interact with at least one user linkage data to identify data representing ownership of one or more data repositories.

In some embodiments, the repository processing apparatus 200 includes input/output circuitry 206 that may, in turn, be in communication with processor 202 to provide output to the user and, in some embodiments, to receive an indication of a user input. The input/output circuitry 206 may comprise one or more user interface(s) and may include a display that may comprise the interface(s) rendered as a web user interface, an application user interface, a user device, a backend system, or the like. In some embodiments, the input/output circuitry 206 may also include a keyboard, a mouse, a joystick, a touch screen, touch areas, soft keys, a microphone, a speaker, or other input/output mechanisms. The processor 202 and/or input/output circuitry 206 comprising the processor may be configured to control one or more functions of one or more user interface elements through computer program instructions (e.g., software and/or firmware) stored on a memory accessible to the processor (e.g., memory 204, and/or the like). In some embodiments, the input/output circuitry 206 includes or utilizes a user-facing application to provide input/output functionality to a client device and/or other display associated with a user.

The communications circuitry 208 may be any means such as a device or circuitry embodied in either hardware or a combination of hardware and software that is configured to receive and/or transmit data from/to a network and/or any other device, circuitry, or module in communication with the repository processing apparatus 200. In this regard, the communications circuitry 208 may include, for example, a network interface for enabling communications with a wired or wireless communication network. For example, the communications circuitry 208 may include one or more network interface card(s), antenna(s), bus(es), switch(es), router(s), modem(s), and supporting hardware, firmware, and/or software, or any other device suitable for enabling communications via one or more communication network(s). Additionally or alternatively, the communications circuitry 208 may include circuitry for interacting with the antenna(s) and/or other hardware or software to cause transmission of signals via the antenna(s) or to handle receipt of signals received via the antenna(s).

The repository scanning circuitry 210 includes hardware, software, firmware, and/or a combination thereof, configured to support various functionality associated with scanning one or more data repositories, and/or identifying data and/or metadata otherwise associated with one or more data repositories, maintained by and/or accessible to the repository processing apparatus 200. For example, in some embodiments, the repository scanning circuitry 210 includes hardware, software, firmware, and/or a combination thereof, configured to perform an efficient scanning process to scan one or more data repositories. Such efficient scanning process(es) may identify file data objects stored in data repositories, and/or data or metadata associated with such file data objects. Alternatively or additionally, in some embodiments, the repository scanning circuitry 210 includes hardware, software, firmware, and/or a combination thereof, configured to identify data and/or metadata associated with the data repositories themselves, including without limitation data and/or metadata representing configuration settings, storage type, data encoding type, storage location identifiers, and/or the like. In some embodiments, the repository scanning circuitry 210 includes hardware, software, firmware, and/or a combination thereof, configured to identify receive user input identifying a data repository. Additionally or alternatively, in some embodiments, the repository scanning circuitry 210 includes hardware, software, firmware, and/or a combination thereof, configured to determine system-based owner identification data for the data repository based at least in part on the system access data.

Additionally or alternatively, in some embodiments, the repository scanning circuitry 210 includes hardware, software, firmware, and/or a combination thereof, configured to execute an efficient scanning process identify a file data object set stored in the data repository and user access information associated with each file data object in the file data object set. Additionally or alternatively, in some embodiments, the repository scanning circuitry 210 includes hardware, software, firmware, and/or a combination thereof, configured to process the data identified via the efficient scanning process (e.g., the file data object set and/or user access information associated with each file data object). For example, the repository scanning circuitry 210 may be configured to identify a prominent access user identifier, determining a subset of possible owners from a plurality of possible owners, and/or identifying file system data and/or third-party service data associated with one or more data repositories.

In some embodiments, the repository scanning circuitry 210 performs one or more of the above-mentioned actions using, in whole or in part, the communications circuitry 208, input/output circuitry 206, and/or processor 202. For example, the repository scanning circuitry 210 may leverage the communications circuitry 208 to perform data receiving and/or transmitting steps, and/or may leverage the input/ output circuitry 206 to perform user outputting (e.g., rendering of user interfaces) and/or user inputting steps (e.g., receiving engagement from a user via device hardware, peripherals, and/or the like). It should be appreciated that, in some embodiments, repository scanning circuitry 210 may include a separate processor, specially configured field programmable gate array (FPGA), or a specially programmed application specific integrated circuit (ASIC).

The owner identification circuitry 212 includes hardware, software, firmware, and/or a combination thereof, configured to support various functionality for identifying data representing and/or associated with an owner of a data repository. For example, in some embodiments, the owner identification circuitry 212 includes hardware, software, firmware, and/or a combination thereof, configured to determine and/or otherwise identify data on, associated with, or accessible to the data repository that indicates a possible owner, and processes such data to identify data representing an owner of the data repository. In some embodiments, the owner identification circuitry 212 includes hardware, software, firmware, and/or a combination thereof, configured to determine system-based owner identification data for a data repository. The system-based owner identification data may be determined, for example, based at least in part on system access data identified for a particular data repository. Additionally or alternatively, in some embodiments, the owner identification circuitry 212 includes hardware, software, firmware, and/or a combination thereof, configured to retrieve repository-based ownership information corresponding to a data repository based at least in part on system-based owner identification data associated with the data repository. In some embodiments, the repository-based ownership information is retrieved from a user linkage database. Additionally or alternatively, in some embodiments, the owner identification circuitry 212 includes hardware, software, firmware, and/or a combination thereof, configured to determine ownership lineage data corresponding to a data repository based at least in part on repository-based ownership information corresponding to the data repository. In some embodiments, the ownership lineage data is determined via a user linkage database.

Additionally or alternatively still, in some embodiments, the owner identification circuitry 212 includes hardware, software, firmware, and/or a combination thereof, configured to process system access data, for example to determine whether such data indicates no owner, a single owner, or a plurality of owners. Additionally or alternatively, in some embodiments, the owner identification circuitry 212 includes hardware, software, firmware, and/or a combination thereof, configured to assign system-based owner identification data representing the identified owner(s). Additionally or alternatively, in some embodiments, the owner identification circuitry 212 includes hardware, software, firmware, and/or a combination thereof, configured to identify system-based owner identification data for a particular data repository based on data identified via an efficient scanning process executed associated with the particular data repository.

In some embodiments, the owner identification circuitry 212 performs one or more of the above-mentioned actions using, in whole or in part, the communications circuitry 208, input/output circuitry 206, and/or processor 202. For example, the owner identification circuitry 212 may leverage the communications circuitry 208 to perform data receiving and/or transmitting steps, and/or may leverage the input/output circuitry 206 to perform user outputting (e.g., rendering of user interfaces) and/or user inputting steps. It should be appreciated that, in some embodiments, owner identification circuitry 212 may include a separate processor, specially configured field programmable gate array (FPGA), or a specially programmed application specific integrated circuit (ASIC).

It should be appreciated that, in some embodiments, one or more of the sets of circuitries 202-212 are combinable. Alternatively or additionally, in some embodiments, one or more of the modules performs some or all of the functionality described associated with another component. For example, in some embodiments, the sets of circuitry 210 and 212 are combined into a single module embodied in hardware, software, firmware, and/or a combination thereof. Similarly, in some embodiments, one or more of the sets of circuitry 210 and/or 212 is combined such that the processor 202 performs one or more of the operations described above with respect to each of these modules.

Example System Interactions and Data Visualizations of the Disclosure

FIG. 3 illustrates a block diagram of an example data system that may include file data objects stored to a shared data repository, in accordance with at least some example embodiments of the present disclosure. The illustrated data system includes a plurality of client devices 302A-302E in communication with one or more shared data repository 304. In this regard, it should be appreciated that each of the client devices 302A-302E may be utilized to access the shared data repository independently. In this regard, for example, client device 302A may be utilized by a first user to access (e.g., read or write) a first file data object stored by the shared data repository 304, while the client device 302B may be utilized by a second user to access a second file data object stored by the shared data repository 304. In this regard, the client device 302A may retrieve the first file data object, or create the first file data object, and utilize it, update it, save new versions, and/or the like to the shared data repository 304. Client device 302B (simultaneously or a different time) may retrieve the second file data object, or create the second file data object, and utilize it, update it, save new versions, and/or the like to the shared data repository 304.

As each user interacts with the respective client devices 302A-302E, the user may utilize such client devices 302A-302E to generate and/or otherwise store a file data object to the shared data repository 304. Alternatively or additionally, one or more users may utilize a client device of the client devices 302A-302E to access and utilize, and/or further modify, an existing file data object to store an updated version of the file data object to the shared data repository 304. In this regard, at any given time, the shared data repository 304 may store any number of file data objects, each associated with various different data properties. In some embodiments, such data properties includes one or more of access data indicating a user that recently accessed the file and/or time associated with said access, data indicating a file creator or author, data indicating a file size, data indicating a file type, and/or the like. It should be appreciated that the data values for data properties associated with each file data object may differ based on the various interactions between the users via client devices 302A-302E and such file data objects.

It should be appreciated that, over time, the total number of file data objects stored to the shared data repository 304 may grow to a significant number. The total number of file data objects stored to the shared data repository 304 (and/or other shared data repositories associated with or embodying a sub-repository of the shared data repository 304) may increase to a significant number that makes accurate and efficient manual maintenance of file data object ownership and/or data repository ownership impractical. Additionally or alternatively, conventional automatic systems that attempt to track ownership of a file data object and/or data repository similarly fail to operate accurately and efficiently, for example due to various actions and/or circumstances external to such systems. In one example context, changes in membership of an organization (e.g., users changing roles, users leaving an organization, new users joining an organization, and/or the like) not trackable by such systems cause the systems to become outdated, inaccurate, and generally unusable. Embodiments described herein leverage user linkage database(s) in conjunction with processing data embodied on and/or associated with operation of the shared data repository 304 to improve the accuracy and/or efficiency of identifying ownership of file data object(s) and/or one or more data repositories. In this regard, embodiments of the present disclosure provide improvements to the technical field of repository management and/or system security, for example by ensuring that user(s) and/or user group(s) that should be identified as associated with certain permissions, privileges, and/or access with respect to particular file data objects are identified accurately.

FIG. 4 illustrates an example visualization of data stored via a shared data repository in accordance with at least some example embodiments of the present disclosure. Specifically, FIG. 4 depicts an example visualization of a file data object set 404 stored by the specially configured shared data repository 304. As depicted, the shared data repository 304 is configured based on particular repository data properties 452 associated with corresponding repository data property values 454. Further as depicted, the file data objects in the file data object set 404 are stored associated with file data object properties ("file properties") 402 with corresponding file property data values represented in each record of the file data object set 404.

It should be appreciated that the shared data repository 304 may be embodied by, as a part of, or associated with one computing device(s) and/or system(s). Such device(s) and/or system(s) may configure various aspects of the shared data repository 304, for example such that the shared data repository 304 is formatted in a particular manner, utilize particular encodings and/or storage methodologies, and/or the like. In some embodiments, the software, hardware, and/or firmware embodying the shared data repository 304 determines one or more data properties 452 and/or data property values 454 for the shared data repository 304. Alternatively or additionally, in some embodiments, third-party software, hardware, firmware, and/or the like, associated with the shared data repository 304 determines one or more data properties 452 and/or the data property values 454 associated therewith. Non-limiting examples of such third-party software, hardware, and/or firmware includes an operating system configured for maintaining and/or accessing the shared data repository 304, a third-party directory service (e.g., Active Directory™ for Windows® offered by Microsoft Corp. of Redmond, WA or the like), or other hardware, software, and/or firmware platforms that affect operation of and/or storage by the shared data repository 304. The The repository data property values 454 corresponding to the repository data properties 452 may be maintained as part of the shared data repository 304 and/or by a separate system. For example, in some embodiments, the repository data property values 454 corresponding to the repository data properties 452 are stored by and/or otherwise managed by the shared data repository 304 itself. In some such embodiments, the shared data repository 304 is accessible to identify and/or retrieve the repository data properties 452 and/or the repository data property values 454 associated therewith from the shared data repository 304. For example, the shared data repository 304 may be queried for its configuration data to retrieve the various repository data properties 452 and/or the repository data property values 454 associated therewith. Alternatively or additionally, in some embodiments, the repository data property values 454 corresponding to the repository data properties 452 are maintained separate from the shared data repository 304 itself. For example, in some embodiments, a repository processing system (such as the repository processing system 102 depicted and described with respect to FIG. 1) configured to access the shared data repository 304 stores and/or otherwise maintains the repository data properties 452 and/or the repository data property values 454 associated therewith. In some such embodiments, the separate system (e.g., a repository processing system) may identify such data without querying the shared data repository 304. In yet some other embodiments, a hybrid storage configuration may be implemented, where the shared data repository 304 manages some portion of the repository data properties 452 and/or corresponding repository data property values 454 and a separate system (e.g., a repository processing system) maintains another portion of the repository data properties 452 and/or the corresponding repository data property values 454.

As illustrated, the repository data properties 452 comprises a file system type property, a file system permissions data property, and a third-party permissions property. Further as illustrated, the particular shared data repository 304 as depicted is associated with the repository data property values 454 that indicate the shared data repository 304 is of the NTFS file system type (e.g., the NTFS journaling file system type, developed by Microsoft), is associated with a particular NTFS permissions set "NTFS_Permissions_Set," and is also associated with third-party permissions represented by an Active Directory permissions set "AD_Permissions_Set." The particular file system type (e.g., NTFS as illustrated) may define one or more aspects associated with the structure of the shared data repository 304 (e.g., how the file data objects are stored via the shared data repository 304), a maximum file size, a maximum file count limit, a file encoding format, and/or the like. In some embodiments, the file system type enables and/or defines particular permissions to users and/or user group(s) for accessing the shared data repository 304—for example the NTFS permissions set as depicted. In this regard, the NTFS permissions set may define particular permissions for accessing and/or otherwise interacting with the shared data repository 304, such as permissions for accessing the shared data repository 304, generating one or more directories and/or sub-directories in the shared data repository 304, reading attribute(s) from the file data object(s) stored thereon, write attribute(s) from the file data object(s) stored thereon, reading file data object(s) stored thereon, and/or writing file data object(s) to the shared data repository 304, deleting from the shared data repository 304, and/or the like. The NTFS permissions set may define such permissions automatically, in response to data-driven determination(s), and/or in response to user input for any number of user(s) and/or user group(s). In some embodiments, default permissions are provided automatically for each user and/or user group until overridden. Such default permissions may be set automatically to a predetermined value, automatically to a determinable value in response to data driven determination(s), and/or in response to user input.

The third-party permission data may be additional to and/or alternative to the file system permissions data. For example, in some embodiments, the third-party permissions data is associated with a third-party service (e.g., embodied in software, hardware, firmware, and/or a combination thereof) that enables management of permissions for accessing and/or otherwise interacting with the shared data repository 304 and/or file data objects stored thereon. Non-limiting examples of such third-party services include directory management application(s), such as Active Directory provided by Microsoft Corp. The AD permissions set as depicted may embody an Active Directory-managed permissions set that defines access to the shared data repository 304 (e.g., file data object read and/or write permissions, file attributes read and/or write permissions, and/or the like as described herein) for one or more Active Directory managed user(s) and/or user account(s). In some embodiments, the third-party service(s) modify file system permissions to enable such access. In other embodiments, the third-party service(s) are built on top the file system permissions to enable such access, such that the underlying file system permissions are not directly altered by the third-party service(s).

Each file data object is associated with the file properties 402. As depicted, the file properties 402 includes a filename identifier representing the unique file name for a particular file data object. The file properties 402 further includes a file creator ID representing a user identifier for a user account that created and/or otherwise stored the file to the shared data repository 304. The file properties 402 further includes a last access ID representing a user identifier for a user account that last accessed the file data object via the shared data repository 304. The file properties 402 further includes an access permissions data that represents various permissions associated with a particular user or user group for reading, writing to, and/or otherwise accessing the file data object from the shared data repository 304. The file properties 402 further includes a last access timestamp data that represents a datetime that the file data object was last accessed by a user. It should be appreciated that such file properties are examples and in other embodiments one or more additional file properties may be stored as part of a file data object, one or more alternative file properties may be stored as part of a file data object, and/or one or more of the file properties 402 may not be stored as part of a file data object.

In some embodiments, the repository data property values 454 corresponding to the repository data properties 452 may determine one or more of the file properties 402. For example, in some embodiments, the shared data repository 304 is configured to store one or more of the file properties 402 for each file data object based on the value for one or more of the repository data property values 454 for the repository data properties 452. As depicted, for example, the access permissions may include data associated with the file system permissions data and/or third-party permissions data corresponding to the shared data repository 304. Additionally or alternatively, in some embodiments the shared data repository 304 is configured via an operating system and/or other hardware, software, and/or firmware interacting with and/or embodying the shared data repository 304.

Each file data object of the file data object set 404 comprises data values for the file properties 402 specific to that particular file data object. For example, the file data object 404A embodies a first file data object of the file data object set 404. The file data object 404A is associated with a filename identifier of "File_1_data.dat," a file creator identifier of "User_1_ID," a last access identifier of "User_1_ID," access permissions of "{User_1_ID: Permissions1}," and a last access timestamp of "03:36:04.2 Jun. 3, 2021." Similarly, the file data object 404B embodies a second file data object of the file data object set 404. The file data object 404B is associated with a filename identifier of "File_2_data.obj," a file creator identifier of "User_2_ID," a last access identifier of "User_1_ID," access permissions of "{User_1_ID: Permissions1; User_2_ID: Permissions2}," and a last access timestamp of "20:13:14.10 Jan. 9, 2021." Such data values are similarly provided for each of the file data objects 404C-404G. In this regard, each of the file data objects may be associated with various identifiers for user(s) and/or user group(s) that created, accessed, have permissions to access, and/or otherwise may interact with each file data object. Any of such data, and/or data for other file properties not depicted, may be utilized to identify owner(s) and/or possible owner(s) of the file data object and/or the shared data repository 304, as described herein.

A scan of the shared data repository 304 may search the shared data repository 304 (e.g., via an efficient scanning process) and identify such data values for each of the file data objects. Alternatively or additionally, the scan may identify particular subsets of the file data object set 404 that meet particular scan criteria (e.g., having one or more particular data values for a given file property of the file properties 402, and/or the like). For example, an efficient scanning process may be initiated that scans the file data object set 404 for all file data objects associated with a last access time more recent than a threshold datetime. Alternatively or additionally, in some embodiments, a scan may identify all file data objects within the shared data repository 304, and/or data and/or metadata thereof, for further processing. For example, in some embodiments, a scanning process may be performed to identify particular data values for one or more of the file properties 402 for each file data object of the file data object set 404, such that the data values may be further processed to identify owner(s) and/or possible owner(s) for the file data object(s) and/or shared data repository 304.

In some embodiments, repository data properties associated with a data repository, and/or file properties associated with file data objects stored therein, are processed to identify system-based owner identification data corresponding to the data repository. Such system-based owner identification data may represent owner(s) and/or possible owner(s) of the data repository based at least in part on the data associated therewith. For example, in some embodiments, the data values for the file creator identifier, last access identifier, access permissions, and/or other file properties, and/or any combination thereof, of the file data objects 404A are processed to determine system-based owner identification data representing the owner of the shared data repository 304. In some such embodiments, the file data objects may be processed to determine the most prominent access user(s), user(s) associated with the most file data object(s) based on one or more of such file properties, and/or the like. Alternatively or additionally, for example in some embodiments, the file system type, file system permissions data, and/or third-party permissions data, or any combination thereof, are processed to determine system-based owner identification data representing the owner of the shared data repository 304. Example process(es) for determining the system-based owner identification data for a data repository are described herein with respect to FIGS. 6-12. It should be appreciated that such process(es) may leverage any of the data properties depicted and described.

FIG. 5 illustrates an example visualization of data stored via a user linkage database in accordance with at least some example embodiments of the present disclosure. Specifically, FIG. 5 depicts a specially configured user linkage database 502 and data stored therein in accordance with at least some example embodiments of the present disclosure. The user linkage database 502 may comprise any number of computing devices embodied in hardware, software, firmware, and/or a combination thereof. For example, in some embodiments, the user linkage database 502 comprises a personnel database embodying a central HR database for a particular organization, which may be embodied as a virtual database of a central server on an internal network, a combination of hardware and/or software accessible over an internal network, and/or the like.

In some embodiments, the user linkage database 502 embodies or includes data pulled from a human resources or other personnel system of records. The data stored therein provides a mapping of user identifier(s) to user data properties (e.g., names, contact information, other attributes, and/or the like). The user identifier(s) may embody particular system-level user identifier(s) extracted or otherwise identified as associated with a data repository or file data objects stored within a particular data repository to be processed. For example, user identifier(s) corresponding to a possible owner, or a plurality of possible owners, may be identified and utilized to retrieve corresponding, up-to-date ownership information and/or ownership lineage information from the user linkage database 502 for such user(s). The data retrieved from the user linkage database 502 may be subsequently processed to perform any of a myriad of action(s), determinations, and/or the like.

A user linkage database may store data associated with any number of users, user groups, relationships between users, and/or the like. It should be appreciated that such data may be stored in any of a myriad of ways, including without limitation various table implementations, data encoding mechanisms, and/or the like. For example, in some embodiments, a user linkage database stores one or more record(s) corresponding to users in a first table, relationship information indicating relationships and/or linkages between such users in a second table, and associations between a user and one or more user group(s) in a third table. Alternatively or additionally, in some embodiments the user linkage database 502 stores such data in a single table. In this regard, it should be appreciated that the particular visualization of the user linkage database 502 and associated data may be implemented in any of such ways.

As depicted, the user linkage database 502 stores a data record for each user. Each data record may store one or more data value(s) associated with particular data properties for each user, such as the data properties 504A-504G (collectively "data properties 504"). It should be appreciated that such data properties 504 are non-limiting examples of data properties that may be maintained by the user linkage database 502. In some embodiments, one or more of the data properties 504 is not maintained by the user linkage database 502. Alternatively or additionally, in some embodiments, one or more alternative data properties is maintained in place of one or more of the data properties 504. Alternatively or additionally still, in some embodiments, one or more additional data properties is maintained as part of the data properties 504. For example, in some embodiments, the data properties 504 includes active status data that indicates whether a particular user is an active user of a particular user group or a sub-user group. In one example context, the active status data indicates whether a user is "active" as a member of a particular organization, such as an employee or a company, or "inactive" for any of a myriad of reasons, such as terminated, on-leave, or has quit. In this regard, in various embodiments, the user linkage database 502 may be custom configured such that the data properties 504 stored by record(s) therein enable desired user-driven functionality.

As illustrated, such data properties 504 includes system-based owner identification data 504A. The data value(s) corresponding to the system-based owner identification data 504A embody user identifier(s) that are utilized by one or more data repositories and that correspond to a particular user represented by the data record. In this regard, the system-based owner identification data may include one or more user identifiers that uniquely represents the user's interaction(s) with a particular data repository. For example, the system-based owner identification data 504A may be stored by a data repository as one or more data value(s) corresponding to one or more file properties for a particular file data object accessed and/or otherwise interacted with by the user. In this regard, each data value of the system-based owner identification data 504A may embody a primary key uniquely representing the user with respect to one or more of such data repositories. Similarly, in some embodiments, system-based owner identification data identified during processing of a particular data repository for purposes of identifying data repository ownership, as described herein, may be compared to the data values for the system-based owner identification data 504A to identify the corresponding data record stored in the user linkage database 502 for a particular user. For example, in circumstances where system-based owner identification data is identified from processing data properties associated with a particular data repository and/or file data object(s) stored in the particular data repository as "User_1_ID," such a data value may be utilized as a key for querying the user linkage database 502 and identifying the corresponding record for the same user. In this regard, the user linkage database 502 may maintain, for each user, such system-based owner identification data 504A corresponding to one or more such data repositories.

The data properties 504 further includes user identifier data 504B. The user identifier data 504B may embody an optional second user identifier corresponding to a particular user. For example, the user identifier 504B may embody a central user identifier assigned or generated by the user for authenticating the user, and/or accessing particular software applications. In one example context, the user identifier data 504B corresponds to a user's internal username and/or identifier maintained associated with a user's access to organization-restricted application functionality, data repositories, and/or the like (e.g., an employee's username for accessing data and/or application(s) via a company's internal network). It should be appreciated that the user identifier data 504B may match or be included in system-based owner identification data 504A in circumstances where the user identifier data 504B is utilized or matches the data utilized by one or more data repositories for identifying a user interacting with any such data repositories.

The data properties 504 further includes various biographical data associated with the user, such as name data 504C. The name data 504C may be associated with a data value representing a user's first name, last name, middle name, and/or other name information. The biographical data stored associated with a particular user may include various other data properties, such as a user's residency address, mailing address, family member names and/or other family information, and the like.

The data properties 504 further includes contact information data 504D associated with the user. As depicted, the contact information data 504D includes an email address associated with the user. In this regard, upon identifying a particular data record corresponding to a particular user, the data record may be utilized to identify the data value of the contact information 504D as a mechanism for transmitting one or more message communication(s) to the user, and/or otherwise communicating with the user. It should be appreciated that the contact information data 504D may include any number of data values corresponding to any number of contact mechanisms. For example, the contact information 504D may include a telephone number, social media handles, alternative or additional email account identifiers, and/or the like.

The data properties 504 further includes role data 504E associated with the user. As depicted, the role data 504E corresponds to data value(s) indicating the user's assigned role or role(s). Such role(s) may correspond to a user's role in a particular user group (e.g., the user's position in a company or other entity structure), system roles assigned to a user account (e.g., administrator, user, and/or the like), or any other attributed role utilized to perform operations via a system having access to the user linkage database 502. In some embodiments, for example, the user linkage database 502 provides role-based authentication of user's attempting to access particular application functionality, such that only user's identified as associated with particular role(s) are provided access.

The data properties 504 further includes user linkage data 504F. The user linkage data 504F corresponds to data object(s) and/or data value(s) indicating linkage or other relationship between the user and another user identifiable via the user linkage database 502 and/or another system. For example, in some embodiments, the user linkage data 504F includes a user linkage or set of user linkages, each user linkage including a user identifier associated with the linked user and/or additional data indicating the type or nature of the relationship represented by the user linkage. In this regard, each linkage indicated by the user linkage data 504F may be identified and/or processed to establish ownership lineage information. In a circumstance where a particular user is identified as a possible owner but no longer may be identified as an owner (e.g., is no longer active in an organization embodying a user group), a new owner may be identified based on the user linkages. For example, in some embodiments, a user linkage of a particular type or to a particular user (e.g., a supervisor, boss, and/or the like) may be identified to identify an appropriate owner. Alternatively or additionally, such linkage(s) for a particular user identified as an owner may be utilized to identify a new owner in a circumstance where the user is identified as unavailable, is unresponsive to one or more message communication(s) and/or alert(s) transmitted to the user, or otherwise indicated as inactive.

The data properties 504 further includes group linkage data 504G. The group linkage data 504G corresponds to data object(s) and/or data value(s) indicating linkage and/or membership of a particular user group and/or sub-group together with any number of other user(s). In some embodiments, the user linkage database 502 includes maintains any number of user group(s) and/or sub-group(s), for example where such group indicate membership by the user, a group name, and/or the like. Such group(s) may be maintained explicitly as one or more data objects stored to the user linkage database 502 and/or separate therefrom or implicitly based on identifiers of the group linkage data 504G for example. User group(s) may be maintained in a manner where all member(s) are given the same association, or in other contexts may be configured such that a separate organizational hierarchy within the group is maintained based on one or more linkage(s). For example, in some embodiments, linkage(s) between users are defined by the role data 504E corresponding to a particular user group, such as where a particular role indicates a supervisory position with respect to one or more other role(s).

The group linkage data 504G includes various identifiers associating the user with a particular user group. Specifically as illustrated, each user is associated with an identifier indicating a first sub-group representing the business unit or team within a particular organization the user is a part of (e.g., a sales team, an IT team, and/or the like), and a second identifier indicating a second sub-group representing the location where the user is located. In this regard, such sub-group(s) of users may be identified based on the particular data values therein for each user, such as to identify users part of a particular team and/or users associated with a particular location.

As illustrated, the user linkage database 502 comprises data records for any number of users, such as the data records 506A-506F (collectively, "user records 506") each representing a different user. In this regard, each of the user records 506 includes data values corresponding to the data properties 504 for a specific user. For example, data record 506A includes data values for a particular user named "Gandorf Gabriel" (indicated by the data value corresponding to the name data 504C) associated with the user identifier "GGabriel" (indicated by the data value corresponding to the user identifier data 504B) and the system-based owner identification data "User_1_ID" (indicated by the data value corresponding to the system-based owner identification data 504A). Further, data record 506A includes data values indicating the user may be contacted via the email "G.Gab@email" (e.g., indicated by the data value for the contact information data 504D) and is associated with the role of "IT coordinator" (e.g., indicated by the data value for the role data 504E. Data record 506A further includes data values indicating the user is associated with various user linkage(s) and group linkage(s), for example data values indicating the user is a member of an "IT" group (e.g., a sub-group for users associated with an information technology position in an organization) and a member of a "CLT" group (e.g., a sub-group for users of an organization located in Charlotte, North Carolina). It should be appreciated that each data value represented in the group linkage data 504G, in circumstances where the group linkage data 504G embodies one or more data values such as a set of data values, the group linkage data 504G may comprise any number of group identifiers that each correspond to a group or sub-group of users.

The user linkage repository 502 may be queried to identify particular data record(s) associated with one or more user(s), linkage(s) between users, and/or the like. For example, in some embodiments, the user linkage database 502 is queried utilizing system-based owner identification data retrieved associated with a particular user identified as an owner or possible owner of a data repository. The query may resolve including the data record corresponding to the user represented by the system-based owner identification data, for example utilizing the system-based owner identification data as a key for comparison with the data value for the stored system-based owner identification data 504A. The data record identified via the query may then be processed, for example to identify and/or process biographical data associated with the user, identify and/or process contact information associated with the user, and/or identify and/or process linkage data associated with the user. For example, embodiments may access such data from one or more data records to determine and/or otherwise retrieve ownership lineage information corresponding to the data repository based on the stored data, and/or the like.

Example process(es) for determining the system-based owner identification data for a data repository are described herein with respect to FIGS. 6-12. It should be appreciated that such process(es) may leverage any of the data properties depicted and described with respect to FIG. 5.

Example Processes of the Disclosure

Having described example systems, apparatuses, computing environments, data visualizations, and the like, example processes in accordance with the present disclosure will now be described. It should be appreciated that each of the flowcharts depicts an example computer-implemented process that may be performed by one or more of the apparatuses, systems, devices, and/or computer program products described herein, for example utilizing one or more of the specially configured components thereof. The blocks indicate operations of each process. Such operations may be arranged in any of a number of ways, including without limitation as depicted and described herein. In some embodiments, one or more blocks of any of the processes described herein occur in-between one or more blocks of another process, before one or more blocks of another process, in parallel with one or more blocks of another process, and/or as a sub-process of a second process. Additionally or alternatively, any of the processes may include some or all operational steps described and/or depicted, including one or more optional blocks in some embodiments. With regard to the flowcharts illustrated herein, one or more of the depicted blocks may be optional in some, or all, embodiments of the disclosure. Optional blocks are depicted with broken (or "dashed") lines. Similarly, it should be appreciated that one or more of the operations of each flowchart may be combinable, replaceable, and/or otherwise altered as described herein.

FIG. 6 illustrates a flowchart depicting example operations of a process for identifying data repository ownership in accordance with at least some example embodiments of the present disclosure. Specifically, FIG. 6 depicts operations of an example process 600. In some embodiments, the process 600 is embodied by computer program code stored on a non-transitory computer-readable storage medium of a computer program product configured for execution to perform the process as depicted and described. Alternatively or additionally, in some embodiments, the process 600 is performed by one or more specially configured computing devices, such as the repository processing apparatus 200 alone or in communication with one or more other component(s), device(s), system(s), and/or the like. In this regard, in some such embodiments, the repository processing apparatus 200 is specially configured by computer-coded instructions (e.g., computer program instructions) stored thereon, for example in the memory 204 and/or another component depicted and/or described herein and/or otherwise accessible to the repository processing apparatus 200, for performing the operations as depicted and described. In some embodiments, the repository processing apparatus 200 is in communication with one or more external apparatus(es), system(s), device(s), and/or the like, to perform one or more of the operations as depicted and described. For purposes of simplifying the description, the process 600 is described as performed by and from the perspective of the repository processing apparatus 200.

The process 600 begins at optional operation 602. At optional operation 602, the repository processing apparatus 200 includes means, such as the repository scanning circuitry 210, the owner identification circuitry 212, the communications circuitry 208, the input/output circuitry 206, the processor 202, and/or the like, or a combination thereof, to receive user input identifying a data repository. In some embodiments, the repository processing apparatus 200 receives a request to identify ownership associated with a particular data repository, wherein the data repository is identified within the request. In this regard, the user may request particular scanning of a data repository (or plurality of data repositories to be scanning in parallel or serially) of interest to the user for processing. In other embodiments, the repository processing apparatus 200 automatically identifies a data repository for further processing. For example, the repository processing apparatus 200 may be identified upon a prescheduled and/or determined process for processing the particular data repository and/or all data repositories accessible to the repository processing apparatus 200.

At operation 604, the repository processing apparatus 200 includes means, such as the repository scanning circuitry 210, the owner identification circuitry 212, the communications circuitry 208, the input/output circuitry 206, the processor 202, and/or the like, or a combination thereof, to identify system access data associated with a data repository. The data repository may be identified by the repository processing apparatus 200 automatically, or may identified based on user input received at an earlier step, such as at operation 602. In some embodiments, the system access data represents access permissions associated with the data repository, for example maintained by the data repository and/or a system associated with controlling or accessing the data repository. Alternatively or additionally, in some embodiments, the system access data represents user(s) or user group(s) having access to the data repository. The system access data may be stored and/or otherwise identified explicitly (e.g., as one or more data values made available by the data repository or an associated system) or derived implicitly from other data associated with the data repository, for example from a scan of user identifiers associated with users that created, accessed, or otherwise interacted with the data repository and/or file data objects stored thereon. In one example context, the system access data comprises NTFS (or other file system type) owner information associated with the data repository or file data objects stored therein. In another example context, the system access data comprises Active Directory (or other third-party services, such as directory services) permissions for accessing the data repository.

At operation 606, the repository processing apparatus 200 includes means, such as the repository scanning circuitry 210, the owner identification circuitry 212, the communications circuitry 208, the input/output circuitry 206, the processor 202, and/or the like, or a combination thereof, to determine system-based owner identification data for the data repository based at least in part on the system access data. The system-based owner identification data may embody a particular user identifier or user group identifier indicating an owner for the data repository as determined from the system access data. In this regard, in some such embodiments, the system-based owner identification data may embody a particular user identifier utilized by the data repository and/or an associated system for enabling access to the data repository. In one example context, the system-based owner identification data comprises a portion of the system access data, such as the first listed owner, the most prominent access user, and/or the like as described herein.

At operation 608, the repository processing apparatus 200 includes means, such as the repository scanning circuitry 210, the owner identification circuitry 212, the communications circuitry 208, the input/output circuitry 206, the processor 202, and/or the like, or a combination thereof, to retrieve, via a user linkage database, repository-based ownership information corresponding to the data repository. In some embodiments, the repository-based ownership information is retrieved based at least in part on the system-based owner identification data associated with the data repository. The user linkage database may be maintained by the repository processing apparatus 200 and/or an associated system separate from the data repository. For example, in some embodiments, the user linkage database embodies a central personnel database (e.g., an HR database) of an organization made available via an internal network. In some such embodiments, the repository processing apparatus 200 queries the user linkage database utilizing the system-based ownership identification data, and receives the repository-based ownership information in response to the query.

The repository-based ownership information may include any of a myriad of data associated with a user or user group indicated as owner of the data repository. For example, the repository-based ownership information may include user-level and/or organizational-level information associated with the user representing the owner of the data repository. The repository-based ownership information may be maintained via the user linkage database independently from the data repository. For example, the user linkage database may be accessed directly by one or more authorized users (e.g., administrators of a particular user group, such as an organization or sub-organizations thereof, such as particular business groups within an organization) as part of enabling particular users (e.g., employees) to have access to various systems, data repositories, and/or the like. In this regard, the user linkage database may include more up-to-date and/or accurate data associated with each user, and may represent a source of truth for particular information (e.g., whether a user continues to be associated with a user group, whether the user remains an active user, relationships between the user and other user(s), and/or the like).

In some embodiments, the repository-based ownership information includes at least a second, standardized user identifier that may be different or the same as a user identifier that corresponds to the user for the particular data repository being processed. For example, in one example context, the standardized user identifier embodies an organizational-level user identifier that uniquely represents the user within the organization of which they are a member (e.g., a company) and/or that operates the data repository. Additionally or alternatively, in some embodiments, the repository-based ownership information includes additional biographical, contact, organizational, and/or additional user data associated with the user identified as owner of the data repository.

Such biographical data may include the user's name, age, birthday, residence, and/or the like. It should be appreciated that some biographical data values may be fixed whereas other biographical data values may be updated over time.

Such contact information may include the user's email address, phone number, mailing address, and/or other identifiers relevant to communicating with the user. One or more portions of contact information may be utilized to initiate transmission of one or more communications with the user, for example to provide a particular alert to the user, to request the user perform a particular action, and/or the like.

Such organizational data may include links between the user and one or more other users indicating relationships between the two users. For example, a first user may be associated with a link to a second user that indicates the second user is associated with at least the same permissions as the first user, such as the first user's superior in an organizational hierarchy. Alternatively or additionally, a first user may be associated with a link to a second user that indicates a secondary user authorized to perform actions on behalf of the first user, such as the first user's assistant or a co-level user. In some embodiments, each link comprises or is associated with data (e.g., an identifier, text data, and/or the like) that uniquely indicates the type of relationship between the linked users.

Additionally or alternatively, such organizational data may include role information indicating a user's role within a user group. Additionally or alternatively such organizational data may include a status identifier associated with the user, and/or with respect to one or more user group(s). In some embodiments, the status identifier indicates whether the user remains active within the user group. For example, in an example context where the user is an employee of an organization, the status identifier may indicate whether the user is an active employee, terminated, retired, and/or the like.

Such additional user data may include any other information associated with a user that may be maintained by a particular entity. For example, the additional user data may include tasks to be performed by the user, data identifiers associated with the user, and/or the like. The user linkage database may be specially configured to store any such additional user data.

At optional operation 610, the repository processing apparatus 200 includes means, such as the repository scanning circuitry 210, the owner identification circuitry 212, the communications circuitry 208, the input/output circuitry 206, the processor 202, and/or the like, or a combination thereof, to determine, via the user linkage database, ownership lineage data corresponding to the data repository. In some embodiments, the ownership lineage data is determined based at least in part on the repository-based ownership information corresponding to an owner identified for the data repository. Such ownership lineage data may be retrieved via one or more subsequent queries, and/or received together with the repository-based ownership information received at an earlier step.

In one example context, the ownership lineage data includes data linkages of the owner to one or more user group(s), such as a team, line-of-business, or other sub-grouping of users within an organization. Such linkages to user group(s) may represent a user's group affiliations or membership at any level of the organizational hierarchy. For example, the owner may be identified as a member of an employee group, an IT personnel group, and a particular line of business, with each group representing a sub-grouping of all members (e.g., employees) of a particular entity (e.g., a company). In this regard, the ownership lineage data may be utilized to determine a particular group with which the owner is linked at any level of an organizational hierarchy for displaying and/or further processing. For example, some embodiments may identify an owner's group affiliation to determine whether or not to perform a subsequent process (e.g., whether to initiate an efficient scanning process with particular scan criteria) based on a determination of whether the owner is a member of or otherwise associated with a linkage to one or more particular user group(s).

In some embodiments, the ownership lineage data represents additional and/or alternative owner(s) of the data repository. Such additional and/or alternative owner(s) may be identified from the repository-based ownership information earlier retrieved. For example, the ownership lineage data may comprise various links between a user represented by system-based owner identification data and other users identified in the user linkage database (e.g., supervisory users, other users of a shared user group, and/or the like). The ownership lineage data may be utilized to identify an alternative and/or active owner, for example in the circumstance where the user identified as an owner and associated with the system-based owner identification data is no longer active as indicated by the repository-based ownership information. In some embodiments, the ownership lineage data is determined without subsequent communication with the user linkage database, for example by processing the ownership lineage data earlier retrieved from the user linkage database. In yet other embodiments, the ownership lineage data is identified via the user linkage database via a subsequent query, for example where such data is not queried as part of the repository-based ownership information to improve the efficiency of the query for repository-based ownership information.

The ownership lineage information may represent any of a myriad of relationships between any number of users. In some embodiments, the ownership lineage information indicates a supervisor or other higher-level user representing an owner. The ownership lineage information for example may include or otherwise represent any number of linkage(s) between a user and/or other user(s) associated therewith. In this regard, the ownership lineage information may be utilized to determine an alternative and/or current owner based on such linkage(s) to the user identified by the repository-based ownership information, for example in a circumstance where the user identified by the repository-based ownership information indicates the user associated therewith is inactive or otherwise not currently the correct owner for the data repository.

The repository processing apparatus 200 may further process and/or utilize the repository-based ownership information and/or ownership lineage data for any of a myriad of reasons. For example, at optional operation 612, the repository processing apparatus 200 includes means, such as the repository scanning circuitry 210, the owner identification circuitry 212, the communications circuitry 208, the input/output circuitry 206, the processor 202, and/or the like, or a combination thereof, to provide, via at least one display, the repository-based based ownership information and/or the ownership lineage data corresponding to the data repository. In this regard, the repository-based ownership information corresponding to the data repository and/or the ownership lineage data corresponding to the data repository may be provided via the at least one display for viewing and/or processing by a user associated therewith. For example, in some embodiments, the repository processing apparatus 200 provides the repository-based ownership information and/or ownership lineage data via one or more transmissions to a client device comprising the at least one display to cause the client device to render one or more specially configured user interfaces comprising the repository-based ownership information and/or ownership lineage data for rendering. In other embodiments, the repository processing apparatus 200 comprises the at least one display, and provides the repository-based ownership information and/or ownership lineage data by causing rendering of such data to the one or more displays. In other embodiments, the repository processing apparatus 200 provides the repository-based ownership information and/or ownership lineage data for further processing.

FIG. 7 illustrates a flowchart depicting additional example operations of a process for identifying data repository ownership in accordance with at least some example embodiments of the present disclosure. Specifically, FIG. 7 depicts operations of an example process 700 for assigning system-based owner identification data based on a single identified owner. In some embodiments, the process 700 is embodied by computer program code stored on a non-transitory computer-readable storage medium of a computer program product configured for execution to perform the process as depicted and described. Alternatively or additionally, in some embodiments, the process 700 is performed by one or more specially configured computing devices, such as the repository processing apparatus 200 alone or in communication with one or more other component(s), device(s), system(s), and/or the like. In this regard, in some such embodiments, the repository processing apparatus 200 is specially configured by computer-coded instructions (e.g., computer program instructions) stored thereon, for example in the memory 204 and/or another component depicted and/or described herein and/or otherwise accessible to the repository processing apparatus 200, for performing the operations as depicted and described. In some embodiments, the repository processing apparatus 200 is in communication with one or more external apparatus(es), system(s), device(s), and/or the like, to perform one or more of the operations as depicted and described. For purposes of simplifying the description, the process 700 is described as performed by and from the perspective of the repository processing apparatus 200.

The process 700 begins at optional operation 702. In some embodiments, the process 700 begins after one or more operations depicted and/or described with respect to any of the other processes described herein. For example, in some embodiments as depicted, the process begins after execution of operation 604. In this regard, some or all of the process 700 may replace or supplement one or more blocks depicted and/or described with respect to any of the other processes described herein. For example, in some embodiments as depicted, the process 700 supplants, supplements, and/or otherwise replaces the operation 606. Additionally or alternatively, as depicted, upon completion of the process 700, flow may return to one or more operations of another process. For example, as depicted, flow may return to operation 608 as depicted and described.

At optional operation 702, the repository processing apparatus 200 includes means, such as the repository scanning circuitry 210, the owner identification circuitry 212, the communications circuitry 208, the input/output circuitry 206, the processor 202, and/or the like, or a combination thereof, to determine the system access data associated with the data repository identifies a single owner. The repository processing apparatus 200 may process the system access data to identify user(s) and/or user group(s) identified therein. For example, in some embodiments the system access data includes a user identifier for each user indicated as an owner or possible owner of the data repository. In this regard, the system access data may include a single user identifier, or otherwise include data indicating a single user, identified by the repository processing apparatus 200 as the owner.

At operation 704, the repository processing apparatus 200 includes means, such as the repository scanning circuitry 210, the owner identification circuitry 212, the communications circuitry 208, the input/output circuitry 206, the processor 202, and/or the like, or a combination thereof, to assign the system-based owner identification data representing the single owner. In some embodiments, the repository processing apparatus 200 assigns a data object embodying the system-based owner identification data to a user identifier utilized by the data repository and/or an associated system controlling access to the data repository to represent the single owner. In this regard, the system-based owner identification data may be assigned to a value that uniquely indicates the single owner without further processing of the data repository and/or file data objects stored thereon. For example, in some embodiments where the repository processing apparatus 200 identifies system access data embodies permission data indicating a single user identifier having access to the data repository, the system-based owner identification data may be assigned the value of the single user identifier.

FIG. 8 illustrates a flowchart depicting additional example operations of a process for identifying data repository ownership in accordance with at least some example embodiments of the present disclosure. Specifically, FIG. 8 depicts operations of an example process 800 for assigning system-based owner identification for no identified owner. In some embodiments, the process 800 is embodied by computer program code stored on a non-transitory computer-readable storage medium of a computer program product configured for execution to perform the process 800 as depicted and described. Alternatively or additionally, in some embodiments, the process 800 is performed by one or more specially configured computing devices, such as the repository processing apparatus 200 alone or in communication with one or more other component(s), device(s), system(s), and/or the like. In this regard, in some such embodiments, the repository processing apparatus 200 is specially configured by computer-coded instructions (e.g., computer program instructions) stored thereon, for example in the memory 204 and/or another component depicted and/or described herein and/or otherwise accessible to the repository processing apparatus 200, for performing the operations of the process 800 as depicted and described. In some embodiments, the repository processing apparatus 200 is in communication with one or more external apparatus(es), system(s), device(s), and/or the like, to perform one or more of the operations as depicted and described. For purposes of simplifying the description, the process 800 is described as performed by and from the perspective of the repository processing apparatus 200.

The process 800 begins at optional operation 802. In some embodiments, the process 800 begins after one or more operations depicted and/or described with respect to any of the other processes described herein. For example, in some embodiments as depicted, the process begins after execution of operation 604. In this regard, some or all of the process 800 may replace or supplement one or more blocks depicted and/or described with respect to any of the other processes described herein. For example, in some embodiments as depicted, the process 800 supplants, supplements, and/or otherwise replaces the operation 606. Additionally or alternatively, as depicted, upon completion of the process 800, flow may return to one or more operations of another process. For example, as depicted, flow may return to operation 608 as depicted and described.

At optional operation 802, the repository processing apparatus 200 includes means, such as the repository scanning circuitry 210, the owner identification circuitry 212, the communications circuitry 208, the input/output circuitry 206, the processor 202, and/or the like, or a combination thereof, to determine the system access data associated with the data repository identifies no owner. The repository processing apparatus 200 may process the system access data to identify multiple user(s) and/or user group(s) identified therein. For example, in some embodiments, the system access data includes no user identifier and/or no active user identifier having particular access and/or permissions to manage or otherwise interact with the data repository. In this regard, the system access data may include no user identifiers or other data indicating any particular user as an owner or possible owner of the data repository.

At operation 804, the repository processing apparatus 200 includes means, such as the repository scanning circuitry 210, the owner identification circuitry 212, the communications circuitry 208, the input/output circuitry 206, the processor 202, and/or the like, or a combination thereof, to execute a scanning process to identify [1] a file data object set stored in the data repository and [2] user access information associated with each file data object of the file data object set. In some embodiments, the scanning process identifies all file data objects stored by the data repository. In some embodiments, the scanning process is embodied by an efficient scanning process that identifies a subset of all file data objects stored by the data repository. For example, the efficient scanning process may identify a subset of file data objects that meet particular scan criteria, such as file data objects that have been accessed within a particular time interval (e.g., the previous month, previous 3 months, previous year, previous 3 years, and/or any determinable time interval), file data objects of a particular file type (e.g., .xlsx files), and/or the like. The scanning process may iterate through the data objects stored by the data repository to identify the file data object set, sort data objects in the data repository, and/or otherwise pre-process the data objects, before scanning the data objects stored thereby.

The user access information associated with each file data object embodies data that identifies a user that has interacted with the file data object in the data repository. In this regard, the repository processing apparatus 200 may determine the user identified by such user access information as a possible owner of the data repository. In some embodiments, the data repository stores each file data object associated with a last modified user identifier file property, the data value of which is assigned the user identifier of a given user upon access by that user of the file data object. In this regard, the user access information may identify the value of the last modified user identifier file property to represent the user that last interacted with the file data object. In some embodiments, the user access information comprises a log of user identifiers for users that accessed, modified, and/or otherwise interacted with the file data object. In yet other embodiments, the user access information comprises a user identifier corresponding to the user that created the file data object. It should be appreciated that the user access information associated with each file data object may include or be assigned the value for any one of the data properties of the file data object, or combination of the data properties of the file data object, maintained by the data repository or otherwise made available by an associated system for managing or controlling the data repository.

At operation 806, the repository processing apparatus 200 includes means, such as the repository scanning circuitry 210, the owner identification circuitry 212, the communications circuitry 208, the input/output circuitry 206, the processor 202, and/or the like, or a combination thereof, to identify a prominent access user identifier based at least in part on the user access information associated with each file data object of the file data object set. The repository processing apparatus 200 may process the user access information to identify the prominent access user identifier. For example, in some embodiments, the repository processing apparatus 200 processes the user access information associated with each file data object to determine the user identifier that appears most in the user access information for each file data object in the file data object set. In one example context, the repository processing apparatus 200 processes a last modified user identifier represented in the user access information for each file data object to identify the prominent access user identifier that corresponds to the user or user group that last modified the most file data objects of the file data object set stored by the data repository. In another context, the repository processing apparatus 200 processes the user access information to identify a user identifier that is indicated by the user access information for each file data object as the creator of the most file data objects in the file data object set stored by the data repository. It should be appreciated that, in other embodiments, the repository processing apparatus 200 may process the user access information for each file data object of the file data object set to identify the prominent user identifier meeting any other particular, desired criteria determinable from user access information for some or all file data objects of the file data object set.

At operation 808, the repository processing apparatus 200 includes means, such as the repository scanning circuitry 210, the owner identification circuitry 212, the communications circuitry 208, the input/output circuitry 206, the processor 202, and/or the like, or a combination thereof, to assign the prominent access user identifier as the system-based owner identification data. In this regard, the repository processing apparatus 200 may assign the value of a data object embodying the system-based owner identification data to the value representing the prominent access user identifier. It should be appreciated that, in some embodiments, the data object(s) embodying the prominent access user identifier may be utilized as the system-based owner identification data.

FIG. 9 illustrates a flowchart depicting additional example operations of a process for identifying data repository ownership in accordance with at least some example embodiments of the present disclosure. Specifically, FIG. 9 depicts operations of an example process 900 for assigning system-based owner identification from an identified plurality of possible owners. In some embodiments, the process 900 is embodied by computer program code stored on a non-transitory computer-readable storage medium of a computer program product configured for execution to perform the process as depicted and described. Alternatively or additionally, in some embodiments, the process 900 is performed by one or more specially configured computing devices, such as the repository processing apparatus 200 alone or in communication with one or more other component(s), device(s), system(s), and/or the like. In this regard, in some such embodiments, the repository processing apparatus 200 is specially configured by computer-coded instructions (e.g., computer program instructions) stored thereon, for example in the memory 204 and/or another component depicted and/or described herein and/or otherwise accessible to the repository processing apparatus 200, for performing the operations of the process 900 as depicted and described. In some embodiments, the repository processing apparatus 200 is in communication with one or more external apparatus(es), system(s), device(s), and/or the like, to perform one or more of the operations as depicted and described. For purposes of simplifying the description, the process 900 is described as performed by and from the perspective of the repository processing apparatus 200.

The process 900 begins at optional operation 902. In some embodiments, the process 800 begins after one or more operations depicted and/or described with respect to any of the other processes described herein. For example, in some embodiments as depicted, the process 900 begins after execution of operation 604. In this regard, some or all of the process 900 may replace or supplement one or more blocks depicted and/or described with respect to any of the other processes described herein. For example, in some embodiments as depicted, the process 900 supplants, supplements, and/or otherwise replaces the operation 606. Additionally or alternatively, as depicted, upon completion of the process 900, flow may return to one or more operations of another process. For example, as depicted, flow may return to operation 608 as depicted and described.

At optional operation 902, the repository processing apparatus 200 includes means, such as the repository scanning circuitry 210, the owner identification circuitry 212, the communications circuitry 208, the input/output circuitry 206, the processor 202, and/or the like, or a combination thereof, to determine the system access data associated with the data repository identifies a plurality of possible owners. The repository processing apparatus 200 may process the system access data to identify the plurality of user(s) and/or user group(s) identified therein. For example, in some embodiments the system access data includes a user identifier for multiple users having particular access and/or permissions associated with the data repository, where such users represent possible owners of the data repository. In this regard, the system access data may include multiple user identifier(s) and/or user group identifier(s), or include other data, indicating a plurality of users identified by the repository processing apparatus 200 as such possible owners of the data repository.

In some embodiments, the repository processing apparatus 200 continues to process data stored by or associated with the data repository to assign appropriate system-based owner identification data for further processing. For example, in some embodiments, the repository processing apparatus 200 performs operations similar to those described with respect to process 800 in circumstances where a plurality of possible owners is identified. At operation 904, the repository processing apparatus 200 includes means, such as the repository scanning circuitry 210, the owner identification circuitry 212, the communications circuitry 208, the input/output circuitry 206, the processor 202, and/or the like, or a combination thereof, to execute a scanning process to identify [1] a file data object set stored in the data repository, and [2] user access information associated with each file data object of the file data object set. In this regard, the repository processing apparatus 200 may execute the scanning process in a similar manner to that depicted and described with respect to operation 804 of process 800.

At operation 906, the repository processing apparatus 200 includes means, such as the repository scanning circuitry 210, the owner identification circuitry 212, the communications circuitry 208, the input/output circuitry 206, the processor 202, and/or the like, or a combination thereof, to identify a prominent access user identifier based at least in part on the user access information associated with each file data object of the file data object set. In this regard, the repository processing apparatus 200 may identify the prominent access user identifier in a similar manner to that depicted and described with respect to operation 806 of process 800. Additionally or alternatively, in some embodiments, the repository processing apparatus 200 may determine if the prominent access user identifier represents a user identified in the plurality of possible owners. In some such embodiments, in circumstances where the repository processing apparatus 200 determines the prominent access user identifier is not identified in the plurality of possible owners, the repository processing apparatus 200 may determine the next most prominent access user identifier. Such operations may continue until the prominent access user identifier is identified in the plurality of possible owners.

At optional operation 908, the repository processing apparatus 200 includes means, such as the repository scanning circuitry 210, the owner identification circuitry 212, the communications circuitry 208, the input/output circuitry 206, the processor 202, and/or the like, or a combination thereof, to assign the prominent access user identifier as the system-based owner identification data. In this regard, the repository processing apparatus 200 may assign the prominent access user identifier as the system-based owner identification data in a similar manner to that depicted and described with respect to operation 808 of process 800.

FIG. 10 illustrates a flowchart depicting additional example operations of a process for identifying data repository ownership in accordance with at least some example embodiments of the present disclosure. Specifically, FIG. 10 depicts operations of an example process 1000 for assigning system-based owner identification from an identified plurality of possible owners. In some embodiments, the process 1000 is embodied by computer program code stored on a non-transitory computer-readable storage medium of a computer program product configured for execution to perform the process as depicted and described. Alternatively or additionally, in some embodiments, the process 1000 is performed by one or more specially configured computing devices, such as the repository processing apparatus 200 alone or in communication with one or more other component(s), device(s), system(s), and/or the like. In this regard, in some such embodiments, the repository processing apparatus 200 is specially configured by computer-coded instructions (e.g., computer program instructions) stored thereon, for example in the memory 204 and/or another component depicted and/or described herein and/or otherwise accessible to the repository processing apparatus 200, for performing the operations of the process 1000 as depicted and described. In some embodiments, the repository processing apparatus 200 is in communication with one or more external apparatus(es), system(s), device(s), and/or the like, to perform one or more of the operations as depicted and described. For purposes of simplifying the description, the process 1000 is described as performed by and from the perspective of the repository processing apparatus 200.

The process 1000 begins at optional operation 1002. In some embodiments, the process 800 begins after one or more operations depicted and/or described with respect to any of the other processes described herein. For example, in some embodiments as depicted, the process 1000 begins after execution of operation 604. In this regard, some or all of the process 1000 may replace or supplement one or more blocks depicted and/or described with respect to any of the other processes described herein. For example, in some embodiments as depicted, the process 1000 supplants, supplements, and/or otherwise replaces the operation 606. Additionally or alternatively, as depicted, upon completion of the process 1000, flow may return to one or more operations of another process. For example, as depicted, flow may return to operation 608 as depicted and described.

At optional operation 1002, the repository processing apparatus 200 includes means, such as the repository scanning circuitry 210, the owner identification circuitry 212, the communications circuitry 208, the input/output circuitry 206, the processor 202, and/or the like, or a combination thereof, to determine the system access data associated with the data repository identifies a plurality of possible owners. In this regard, the repository processing apparatus 200 may determine the system access data associated with the data repository identifies a plurality of possible owners in a similar manner to that depicted and described with respect to operation 902 of process 900.

In circumstances where a plurality of possible owners are identified, the file data objects stored to the data repository may be scanned and/or processed to identify a particular owner. For example, in some embodiments, data and/or metadata associated with the file data object(s) stored to the data repository may be identified. Such data and/or metadata may be processed to, in some embodiments, identify the user that most recently created and/or modified a file data object within the data repository. Alternatively or additionally, in some embodiments, such data and/or metadata is processed to identify the user that is associated with the greatest number of files stored in the data repository. Alternatively or additionally still, in some embodiments, a combination of such determinations may be performed. For example, in some embodiments, the apparatus 200 determines a user identifier associated with the most file data object(s), and determines the user identifier that most recently accessed and/or otherwise modified a file data object in the data repository in a circumstance where there is a tie in the number of file data object(s). It should be appreciated that any other of a number of determinations may be performed to identify an owner of the data repository based at least in part on the value(s) for any one or more of the file properties for the file data object(s) stored therein.

At optional operation 1004, the repository processing apparatus 200 includes means, such as the repository scanning circuitry 210, the owner identification circuitry 212, the communications circuitry 208, the input/output circuitry 206, the processor 202, and/or the like, or a combination thereof, to execute a scanning process to identify [1] a file data object set stored in the data repository, and [2] a file owner identifier set corresponding to the file data object set. In some embodiments, the scanning process identifies all file data objects stored by the data repository. In some embodiments, the scanning process is embodied by an efficient scanning process that identifies a subset of all file data objects stored by the data repository. For example, the efficient scanning process may identify a subset of file data objects that meet particular scan criteria, such as file data objects that have been accessed within a particular time interval (e.g., the previous month, previous 3 months, previous year, previous 3 years, and/or any determinable time interval), file data objects of a particular file type (e.g., .xlsx files), and/or the like. The scanning process may iterate through the data objects stored by the data repository to identify the file data object set, sort data objects in the data repository, and/or otherwise pre-process the data objects, before scanning the data objects stored thereby.

The repository processing apparatus 200 may identify a file owner identifier set comprising a file owner identifier for each file data object in the file data object set. The file owner identifier may represent a particular user or user group identified as owner for the corresponding file data object. In this regard, the repository processing apparatus 200 may determine the file owner identifier for a particular file data object based on one or more data values for file properties of the file data object. For example, in some embodiments, the repository processing apparatus 200 identifies the file owner identifier as the user identifier that last modified the file data object, such as based on the data value for a last modified user identifier file property. In some embodiments, the repository processing apparatus 200 identifies the file owner identifier as the user identifier that created the file data object, such as based on the data value for a creator user identifier file property. It should be appreciated that, in other embodiments, a user may be identified as a file owner utilizing the data value for any file property or combination of file properties associated with the file data object.

At operation 1006, the repository processing apparatus 200 includes means, such as the repository scanning circuitry 210, the owner identification circuitry 212, the communications circuitry 208, the input/output circuitry 206, the processor 202, and/or the like, or a combination thereof, to determine a subset of possible owners from the plurality of possible owners that are not represented in the file owner identifier set. The repository processing apparatus 200 may compare the user(s) and/or user group(s) identified by the file owner identifier set with the plurality of possible owners identified by the system access data. As such a comparison is performed, the repository processing apparatus 200 may track the user(s) and/or user group(s) that are identified by the system access data as a possible owner but not identified in the file owner identifier set. In this regard, the subset of possible owners not represented in the file owner identifier set may include user identifier(s) for the user(s) and/or user group(s) that are identified by the system access data but are not associated with owning any of the files currently stored in the data repository.

At operation 1008, the repository processing apparatus 200 includes means, such as the repository scanning circuitry 210, the owner identification circuitry 212, the communications circuitry 208, the input/output circuitry 206, the processor 202, and/or the like, or a combination thereof, to exclude the subset of possible owners from the plurality of possible owners to determine a remaining possible owner set. In some embodiments, the repository processing apparatus 200 may remove the subset of possible owners not represented in the file owner identifier set from the subset of possible owners, or may store one or more new data object(s) representing the remaining possible owners from the plurality of possible owners that are identified in the file owner identifier set. In this regard, the remaining possible owner set may embody the possible owners identified from the system access data that are further represented as an owner of at least one file data object stored in the data repository.

At operation 1010, the repository processing apparatus 200 includes means, such as the repository scanning circuitry 210, the owner identification circuitry 212, the communications circuitry 208, the input/output circuitry 206, the processor 202, and/or the like, or a combination thereof, to identify the system-based owner identification data based at least in part on the remaining possible owner set. In some embodiments, the repository processing apparatus 200 assigns a value of the system-based owner identification data to represent an owner that exists in the remaining possible owner set. For example, in some embodiments, the repository processing apparatus 200 assigns the system-based owner identification data to a user identifier corresponding to the first user identified in the remaining possible owner set. Additionally or alternatively, in some embodiments, the repository processing apparatus 200 assigns the system-based owner identification data to a user identifier corresponding to the user that is represented most in the file owner identifier set. In some such embodiments, the repository processing apparatus 200 may track the number of times each owner is represented in the file owner identifier set, and assign the system-based owner identification data to the user identifier for the owner represented the greatest number of times.

In some embodiments, the apparatus 200 identifies and/or processes any number of other file properties for the file data object set stored to the data repository to identify the system-based owner identification data based at least in part on the remaining possible owner set. For example, in some embodiments, a prominent access user is identified as described herein. Additionally or alternatively, apparatus 200 may process the file data object set to determine the user identifier indicated as owner for the largest number of file data objects. Additionally or alternatively still, the apparatus 200 may process the file data object set to determine the user identifier for the user that most recently accessed a file data object in the data repository. In yet other embodiments, the apparatus 200 may process any other file properties to determine a user identifier embodying the system-based owner identification data. Alternatively or additionally, in some embodiments, the apparatus 200 may perform any of combination of such determinations in any order to identify the user identifier most likely representing the owner of the data repository, and assigns the system-based owner identification data to the user identifier accordingly.

FIG. 11 illustrates a flowchart depicting additional example operations of a process for identifying data repository ownership in accordance with at least some example embodiments of the present disclosure. Specifically, FIG. 11 depicts operations of an example process 1100 for identifying system access data. In some embodiments, the process 1100 is embodied by computer program code stored on a non-transitory computer-readable storage medium of a computer program product configured for execution to perform the process as depicted and described. Alternatively or additionally, in some embodiments, the process 1100 is performed by one or more specially configured computing devices, such as the repository processing apparatus 200 alone or in communication with one or more other component(s), device(s), system(s), and/or the like. In this regard, in some such embodiments, the repository processing apparatus 200 is specially configured by computer-coded instructions (e.g., computer program instructions) stored thereon, for example in the memory 204 and/or another component depicted and/or described herein and/or otherwise accessible to the repository processing apparatus 200, for performing the operations of the process 1100 as depicted and described. In some embodiments, the repository processing apparatus 200 is in communication with one or more external apparatus(es), system(s), device(s), and/or the like, to perform one or more of the operations as depicted and described. For purposes of simplifying the description, the process 1100 is described as performed by and from the perspective of the repository processing apparatus 200.

The process 1100 begins at operation 1102. In some embodiments, the process 800 begins after one or more operations depicted and/or described with respect to any of the other processes described herein. For example, in some embodiments as depicted, the process 1100 begins after execution of operation 602. In this regard, some or all of the process 1100 may replace or supplement one or more blocks depicted and/or described with respect to any of the other processes described herein. For example, in some embodiments as depicted, the process 1100 supplants, supplements, and/or otherwise replaces the operation 604. Additionally or alternatively, as depicted, upon completion of the process 1100, flow may return to one or more operations of another process. For example, as depicted, flow may return to operation 606 as depicted and described.

At operation 1102, the repository processing apparatus 200 includes means, such as the repository scanning circuitry 210, the owner identification circuitry 212, the communications circuitry 208, the input/output circuitry 206, the processor 202, and/or the like, or a combination thereof, to query at least one computing system associated with the data repository for file system data associated with the data repository. In some embodiments, the at least one computing system comprises the data repository itself. In other embodiments, the at least one computing system comprises a separate computing system responsible for configuring the data repository.

In some embodiments, the repository processing apparatus 200 queries the computing system for file system data embodying permission data for accessing the data repository. For example, the repository processing apparatus 200 may query the data repository or an associated controlling computing system for access permissions defined by the journaling system of the data repository. For example, in a circumstance where the data repository is configured in accordance with NTFS journaling system, the repository processing apparatus 200 may query for NTFS access permissions to the data repository. In other example circumstances, the repository processing apparatus 200 queries for other permissions controlled or associated with the underlying configuration of the data repository for storing the file data objects.

At operation 1104, the repository processing apparatus 200 includes means, such as the repository scanning circuitry 210, the owner identification circuitry 212, the communications circuitry 208, the input/output circuitry 206, the processor 202, and/or the like, or a combination thereof, to identify the system access data comprising the file system data. In this regard, the repository processing apparatus 200 may process the system access data comprising the file system data to identify owner(s) and/or possible owner(s) represented in the file system data.

FIG. 12 illustrates a flowchart depicting additional example operations of a process for identifying data repository ownership in accordance with at least some example embodiments of the present disclosure. Specifically, FIG. 12 depicts operations of an example process 1200 for identifying system access data from third-party service data. In some embodiments, the process 1200 is embodied by computer program code stored on a non-transitory computer-readable storage medium of a computer program product configured for execution to perform the process as depicted and described. Alternatively or additionally, in some embodiments, the process 1200 is performed by one or more specially configured computing devices, such as the repository processing apparatus 200 alone or in communication with one or more other component(s), device(s), system(s), and/or the like. In this regard, in some such embodiments, the repository processing apparatus 200 is specially configured by computer-coded instructions (e.g., computer program instructions) stored thereon, for example in the memory 204 and/or another component depicted and/or described herein and/or otherwise accessible to the repository processing apparatus 200, for performing the operations of the process 1200 as depicted and described. In some embodiments, the repository processing apparatus 200 is in communication with one or more external apparatus(es), system(s), device(s), and/or the like, to perform one or more of the operations as depicted and described. For purposes of simplifying the description, the process 1200 is described as performed by and from the perspective of the repository processing apparatus 200.

The process 1200 begins at operation 1202. In some embodiments, the process 800 begins after one or more operations depicted and/or described with respect to any of the other processes described herein. For example, in some embodiments as depicted, the process 1200 begins after execution of operation 602. In this regard, some or all of the process 1200 may replace or supplement one or more blocks depicted and/or described with respect to any of the other processes described herein. For example, in some embodiments as depicted, the process 1200 supplants, supplements, and/or otherwise replaces the operation 604. Additionally or alternatively, as depicted, upon completion of the process 1200, flow may return to one or more operations of another process. For example, as depicted, flow may return to operation 606 as depicted and described.

At operation 1202, the repository processing apparatus 200 includes means, such as the repository scanning circuitry 210, the owner identification circuitry 212, the communications circuitry 208, the input/output circuitry 206, the processor 202, and/or the like, or a combination thereof, to query at least one computing system associated with the data repository for third-party service data associated with the data repository. In some embodiments, the at least one computing system comprises the data repository itself. In other embodiments, the at least one computing system comprises a separate computing system responsible for configuring the data repository.

In some embodiments, the repository processing apparatus 200 queries the computing system for third-party service data embodying permission data maintained by one or more services embodied in hardware, software, firmware, and/or the like, that controls access to the data repository. In some embodiments, such third-party services include an operating system associated with the computing system and/or data repository. Alternatively or additionally, in some embodiments, such third-party services include a directory service that serves as an access point for maintaining, interacting with, and/or otherwise controlling access to the data repository and/or other data repositories, for example data repositories connected to a communications network. Non-limiting examples of a third-party service embodying a directory service include Active Directory™ provided by Microsoft Corp. Other non-limiting examples of a third-party service embodying a directory service include Apple Open Directory provided by Apple Inc. of Cupertino, CA, Apache Directory Server provided by the Apache Software Foundation of Forest Hill, MD, and/or the like. Such a third-party service may be queried for third-party service data identifying users having particular permissions and/or access to the data repository, and representing owners of the data repository.

At operation 1204, the repository processing apparatus 200 includes means, such as the repository scanning circuitry 210, the owner identification circuitry 212, the communications circuitry 208, the input/output circuitry 206, the processor 202, and/or the like, or a combination thereof, to identify the system access data comprising the third-party service data. In this regard, the repository processing apparatus 200 may process the system access data comprising the third-party service data to identify owner(s) and/or possible owner(s) represented in the third-party service data.

CONCLUSION

Although an example processing system has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a repository management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending data, files, documents, and/or the like, to and receiving data, files, documents, and/or the like, from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. An apparatus comprising at least one hardware processor and at least one memory, the at least one memory having computer-coded instructions stored thereon that, in execution with the at least one hardware processor, configure the apparatus to:
   identify system access data that comprises permissions particular to a data repository, wherein the system access data is an Active Directory group permission;
   identify a number of owners based on the Active Directory group permission;
   determine that the number of owners identified based on the Active Directory group permission is a plurality of possible owners;
   based on determining that the number of owners is the plurality of possible owners:
     execute a scanning process to identify:
       a file data object set stored in the data repository, and user access information associated with each file data object of the file data object set; and
     identify a prominent access user identifier based at least in part on the user access information associated with each file data object of the file data object set, wherein the prominent access user identifier uniquely identifies system-based owner identification data to be associated to an owner of the data repository, wherein the system-based owner identification data corresponds to a single owner or a single group;
   determine the system-based owner identification data for the data repository based at least in part on the system access data, the determination that the number of owners is the plurality of possible owners, and the permissions particular to the data repository wherein determining the system-based owner identification for the data repository includes assigning the prominent access user identifier as the system-based owner identification data;
   retrieve, via a user linkage database, repository-based ownership information corresponding to the data repository based at least in part on matching an element of the system-based owner identification data associated with the data repository with an entry in the user linkage database, the entry comprising at least one of particular data associated with an owner of the data repository or a linkage between the owner and a user, wherein the user linkage database is distinct from the data repository; and
   determine, via the user linkage database, ownership lineage data corresponding to the data repository based at least in part on the repository-based ownership information corresponding to the data repository.

2. The apparatus according to claim 1, wherein to determine the system-based owner identification data based at least in part on the system access data, the apparatus is configured to:
   based on determining that the number of owners is the plurality of possible owners:
     execute the scanning process to identify:
       a file owner identifier set corresponding to the file data object set;
     determine a subset of possible owners from the plurality of possible owners that are not represented in the file owner identifier set;
     exclude the subset of possible owners from the plurality of possible owners to determine a remaining possible owner set; and
     identify the system-based owner identification data based at least in part on the remaining possible owner set.

3. The apparatus according to claim 1, the apparatus further configured to:
provide, via at least one display, the ownership lineage data corresponding to the data repository.

4. The apparatus according to claim 1, wherein to identify the system access data, the apparatus is configured to:
query at least one computing system associated with the data repository for file system data associated with the data repository,
wherein the system access data comprises the file system data.

5. The apparatus according to claim 1, wherein to identify the system access data, the apparatus is configured to:
query at least one computing system associated with the data repository for third-party service data associated with the data repository,
wherein the system access data comprises the third-party service data.

6. A computer-implemented method comprising:
identifying system access data that comprises permissions particular to a data repository, wherein the system access data is an Active Directory group permission;
identifying a number of owners based on the Active Directory group permission;
determining that the number of owners identified based on the Active Directory group permission is a plurality of possible owners;
based on determining that the number of owners is the plurality of possible owners:
executing a scanning process to identify:
a file data object set stored in the data repository, and user access information associated with each file data object of the file data object set; and
identifying a prominent access user identifier based at least in part on the user access information associated with each file data object of the file data object set, wherein the prominent access user identifier uniquely identifies system-based owner identification data to be associated to an owner of the data repository, wherein the system-based owner identification data corresponds to a single owner or a single group;
determining the system-based owner identification data for the data repository based at least in part on the system access data, the determination that the number of owners is the plurality of possible owners, and the permissions particular to the data repository wherein determining the system-based owner identification for the data repository includes assigning the prominent access user identifier as the system-based owner identification data;
retrieving, via a user linkage database, repository-based ownership information corresponding to the data repository based at least in part on matching an element of the system-based owner identification data associated with the data repository with an entry in the user linkage database, the entry comprising at least one of particular data associated with an owner of the data repository or a linkage between the owner and a user, wherein the user linkage database is distinct from the data repository; and
determining, via the user linkage database, ownership lineage data corresponding to the data repository based at least in part on the repository-based ownership information corresponding to the data repository.

7. The computer-implemented method according to claim 6, wherein determining the system-based owner identification data based at least in part on the system access data comprises:
based on determining that the number of owners is the plurality of possible owners:
executing the scanning process to identify:
a file owner identifier set corresponding to the file data object set;
determining a subset of possible owners from the plurality of possible owners that are not represented in the file owner identifier set;
excluding the subset of possible owners from the plurality of possible owners to determine a remaining possible owner set; and
identifying the system-based owner identification data based at least in part on the remaining possible owner set.

8. The computer-implemented method according to claim 6, the computer-implemented method further comprising:
providing, via at least one display, the ownership lineage data corresponding to the data repository.

9. The computer-implemented method according to claim 6, wherein identifying the system access data comprises:
querying at least one computing system associated with the data repository for file system data associated with the data repository,
wherein the system access data comprises the file system data.

10. The computer-implemented method according to claim 6, wherein identifying the system access data comprises:
querying at least one computing system associated with the data repository for third-party service data associated with the data repository,
wherein the system access data comprises the third-party service data.

11. An apparatus comprising at least one hardware processor and at least one memory, the at least one memory having computer-coded instructions stored thereon that, in execution with the at least one hardware processor, configure the apparatus to:
identify system access data that comprises permissions particular to a data repository, wherein the system access data is an Active Directory group permission;
identify a number of owners based on the Active Directory group permission;
determine that the number of owners identified based on the Active Directory group permission is no owner;
based on determining that the number of owners is no owner:
execute a scanning process to identify:
a file data object set stored in the data repository; and
user access information associated with each file data object of the file data object set, and
identify a prominent access user identifier based at least in part on the user access information associated with each file data object of the file data object set; and
determine system-based owner identification data for the data repository based at least in part on the system access data, the determination that the number of owners is no owner, and the permissions particular to the data repository wherein determining the system-based owner identification for the data repository includes assigning the prominent access user identifier as the system-based owner identification data;

retrieve, via a user linkage database, repository-based ownership information corresponding to the data repository based at least in part on matching an element of the system-based owner identification data associated with the data repository with an entry in the user linkage database, the entry comprising at least one of particular data associated with an owner of the data repository or a linkage between the owner and a user, wherein the user linkage database is distinct from the data repository; and determine, via the user linkage database, ownership lineage data corresponding to the data repository based at least in part on the repository-based ownership information corresponding to the data repository.

12. The apparatus according to claim 11, the apparatus further configured to:

provide, via at least one display, the ownership lineage data corresponding to the data repository.

13. The apparatus according to claim 11, wherein to identify the system access data, the apparatus is configured to:

query at least one computing system associated with the data repository for file system data associated with the data repository, wherein the system access data comprises the file system data.

14. The apparatus according to claim 11, wherein to identify the system access data, the apparatus is configured to:

query at least one computing system associated with the data repository for third-party service data associated with the data repository, wherein the system access data comprises the third-party service data.

* * * * *